(12) United States Patent
Koegler et al.

(10) Patent No.: US 8,396,749 B2
(45) Date of Patent: Mar. 12, 2013

(54) PROVIDING CUSTOMER RELATIONSHIP MANAGEMENT APPLICATION AS ENTERPRISE SERVICES

(75) Inventors: Alexander Koegler, Walldorf (DE); Hamid Moghaddam, Osterburken (DE); Christian Haas, Heidelberg (DE); Berthold Wocher, Gaiberg (DE); Steffen Hartig, Nussloch (DE); Devasena Rajamohan, Bad Schoenborn (DE); Joachim Barnbeck, Heidelberg (DE); Olivier M. Dreidemy, Holving (FR); Alexandra Mark, Wiesloch (DE); Yuh-Cherng Wu, Sunnyvale, CA (US); Christopher Ronnewinkel, Heidelberg (DE); Michael Lesk, Ketsch (DE); Andre Wachholz-Prill, Bellheim (DE); Martina Lahr, Weinheim (DE); Joerg Walzenbach, Uberherrn (DE); Helge Schulte, Saarbruecken (DE); Volkmar Stegmann, Altlussheim (DE); Ingo Pfitzner, Berlin (DE); Christoph Engler, Walldorf (DE); Wilfried Merkel, Heidelberg (DE); Thomas Bach, Muehlhausen (DE); Cordula Ude, Muehlhausen (DE); Peer Marschall, Heidelberg (DE); Tao Yu, Walldorf (DE); Stefan Adelmann, Mannheim (DE); Rainer Heun, Schwetzingen (DE); Katja Kasteleiner, Mannheim (DE); Steffen Tatzel, Nussloch (DE); Dagmar Opitz, Sandhausen (DE); Martina Keller, Niefem (DE); Andrea Sudbrack, Heldelberg (DE); Uwe Herold, Ketsch (DE); Georg Podhajsky, Phillippsburg-Rheinsheim (DE); Thomas Nitschke, Nussloch (DE); Stefan Franke, Buxtehude (DE); Wolfgang Nieswand, Muehlhausen (DE); Michael Jung, Quierschied (DE); Christoph Lehner, Heidelberg (DE); Boris Krems, Reichartshausen (DE); Dietmar Storz, Heidelberg (DE); Tariq Khasawneh, Bad Schoenborn (DE); Theo Zimmermann, Wiesloch (DE); Naci Kalyoncu, Darmstadt (DE)

(73) Assignee: SAP AG, Walldorf (DE)

( * ) Notice: Subject to any disclaimer, the term of this patent is extended or adjusted under 35 U.S.C. 154(b) by 1044 days.

(21) Appl. No.: 11/396,259

(22) Filed: Mar. 30, 2006

(65) Prior Publication Data

US 2007/0233574 A1    Oct. 4, 2007

(51) Int. Cl.
    *G06Q 30/00*      (2006.01)
(52) U.S. Cl. ........... 705/26.1; 705/27.1; 705/28; 705/29
(58) Field of Classification Search .................... 705/26, 705/27, 28
See application file for complete search history.

(56) References Cited

U.S. PATENT DOCUMENTS 4,947,321 A    8/1990   Spence et al.
(Continued)

FOREIGN PATENT DOCUMENTS

WO      00/23874      4/2000
(Continued)

OTHER PUBLICATIONS

Arch-int, S. et al.; "Development of Industrial Information Systems on the Web Using Business Components"; Computers in Industry; vol. 60; 2003; pp. 231-250.*
(Continued)

*Primary Examiner* — Jeffrey A Smith
*Assistant Examiner* — Brandy A Zukanovich
(74) *Attorney, Agent, or Firm* — Fish & Richardson P.C.

(57) ABSTRACT

Methods and apparatus, including systems and computer program products, for a services architecture design that provides enterprise services having customer relationship management functionality at the level of an enterprise application. The design includes a set of service operations, process components, and optionally deployment units. Suitable business objects are also described.

19 Claims, 19 Drawing Sheets

U.S. PATENT DOCUMENTS

| | | |
|---|---|---|
| 5,361,198 A | 11/1994 | Harmon et al. |
| 5,550,734 A | 8/1996 | Tarter et al. |
| 5,560,005 A | 9/1996 | Hoover et al. |
| 5,566,097 A | 10/1996 | Myers et al. |
| 5,586,312 A | 12/1996 | Johnson et al. |
| 5,590,277 A | 12/1996 | Fuchs et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,710,917 A | 1/1998 | Musa et al. |
| 5,768,119 A | 6/1998 | Havekost et al. |
| 5,822,585 A | 10/1998 | Noble et al. |
| 5,832,218 A | 11/1998 | Gibbs et al. |
| 5,848,291 A | 12/1998 | Milne et al. |
| 5,867,495 A | 2/1999 | Elliott et al. |
| 5,870,588 A | 2/1999 | Rompaey et al. |
| 5,881,230 A | 3/1999 | Christensen et al. |
| 5,893,106 A | 4/1999 | Brobst et al. |
| 5,898,872 A | 4/1999 | Richley |
| 5,918,219 A | 6/1999 | Isherwood |
| 5,987,247 A | 11/1999 | Lau |
| 5,991,536 A | 11/1999 | Brodsky et al. |
| H1830 H | 1/2000 | Petrimoulx et al. |
| 6,028,997 A | 2/2000 | Leymann et al. |
| 6,038,393 A | 3/2000 | Iyengar et al. |
| 6,049,838 A | 4/2000 | Miller et al. |
| 6,067,559 A | 5/2000 | Allard et al. |
| 6,070,197 A | 5/2000 | Cobb et al. |
| 6,112,024 A | 8/2000 | Almond et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,192,390 B1 | 2/2001 | Berger et al. |
| 6,208,345 B1 | 3/2001 | Sheard et al. |
| 6,237,136 B1 | 5/2001 | Sadahiro |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Costanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,640,238 B1 | 10/2003 | Bowman-Amuah |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,757,837 B1 | 6/2004 | Platt et al. |
| 6,764,009 B2 | 7/2004 | Melick et al. |
| 6,772,216 B1 | 8/2004 | Ankireddipally et al. |
| 6,782,536 B2 | 8/2004 | Moore et al. |
| 6,789,252 B1 | 9/2004 | Burke et al. |
| 6,845,499 B2 | 1/2005 | Srivastava et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,898,783 B1 | 5/2005 | Gupta et al. |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 * | 7/2006 | Godlewski et al. ............. 705/22 |
| 7,076,766 B2 | 7/2006 | Wirts et al. |
| 7,100,195 B1 | 8/2006 | Underwood |
| 7,103,873 B2 | 9/2006 | Tanner et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,149,887 B2 | 12/2006 | Morrison et al. |
| 7,155,403 B2 | 12/2006 | Cirulli et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,213,232 B1 | 5/2007 | Knowles |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,249,044 B2 | 7/2007 | Kumar et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 * | 1/2008 | Wirtz et al. ................. 705/26 |
| 7,322,024 B2 | 1/2008 | Carlson et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 * | 8/2008 | Goel ............................. 705/26 |
| 7,418,424 B2 | 8/2008 | Martin et al. |
| 7,424,701 B2 | 9/2008 | Kendall et al. |
| 7,433,979 B2 | 10/2008 | Need |
| 7,448,022 B1 | 11/2008 | Ram et al. |
| 7,451,432 B2 | 11/2008 | Shukla et al. |
| 7,460,654 B1 | 12/2008 | Jenkins et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,574,694 B2 | 8/2009 | Mangan et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,644,390 B2 | 1/2010 | Khodabandehloo et al. |
| 7,657,406 B2 | 2/2010 | Tolone et al. |
| 7,657,445 B1 | 2/2010 | Goux |
| 7,665,083 B2 | 2/2010 | Demant et al. |

| Patent No. | Date | Inventor |
|---|---|---|
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1* | 2/2004 | Oney et al. ............... 705/28 |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1* | 8/2004 | Wille ............... 705/28 |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1 | 2/2005 | Bracken et al. |
| 2005/0060235 A2* | 3/2005 | Byrne ............... 705/26 |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1* | 12/2005 | Bruns et al. ............... 705/28 |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |

| | | | |
|---|---|---|---|
| 2007/0156493 | A1 | 7/2007 | Tebbe et al. |
| 2007/0156499 | A1 | 7/2007 | Berger et al. |
| 2007/0156500 | A1 | 7/2007 | Merkel et al. |
| 2007/0156538 | A1 | 7/2007 | Peter et al. |
| 2007/0156550 | A1 | 7/2007 | Der Emde et al. |
| 2007/0156731 | A1 | 7/2007 | Ben-Zeev |
| 2007/0162893 | A1 | 7/2007 | Moosmann et al. |
| 2007/0164849 | A1 | 7/2007 | Haeberle et al. |
| 2007/0168303 | A1 | 7/2007 | Moosmann et al. |
| 2007/0174068 | A1* | 7/2007 | Alfandary et al. ............ 705/1 |
| 2007/0174145 | A1 | 7/2007 | Hetzer et al. |
| 2007/0174811 | A1 | 7/2007 | Kaetker et al. |
| 2007/0186209 | A1 | 8/2007 | Kaetker et al. |
| 2007/0197877 | A1 | 8/2007 | Decorte et al. |
| 2007/0198391 | A1 | 8/2007 | Dreyer et al. |
| 2007/0214065 | A1 | 9/2007 | Kahlon et al. |
| 2007/0220046 | A1 | 9/2007 | Moosmann et al. |
| 2007/0220143 | A1 | 9/2007 | Lund et al. |
| 2007/0233539 | A1 | 10/2007 | Suenderhauf et al. |
| 2007/0233541 | A1 | 10/2007 | Schorr et al. |
| 2007/0233545 | A1 | 10/2007 | Cala et al. |
| 2007/0233574 | A1 | 10/2007 | Koegler et al. |
| 2007/0233575 | A1 | 10/2007 | Berger et al. |
| 2007/0233581 | A1 | 10/2007 | Peter |
| 2007/0233598 | A1 | 10/2007 | Der Emde et al. |
| 2007/0234282 | A1 | 10/2007 | Prigge et al. |
| 2007/0239508 | A1 | 10/2007 | Fazal et al. |
| 2007/0239569 | A1* | 10/2007 | Lucas et al. ............ 705/28 |
| 2007/0265860 | A1 | 11/2007 | Herrmann et al. |
| 2007/0265862 | A1 | 11/2007 | Freund et al. |
| 2008/0004929 | A9 | 1/2008 | Raffel et al. |
| 2008/0017722 | A1 | 1/2008 | Snyder et al. |
| 2008/0027831 | A1* | 1/2008 | Gerhardt ............ 705/27 |
| 2008/0065437 | A1 | 3/2008 | Dybvig |
| 2008/0120129 | A1 | 5/2008 | Seubert et al. |
| 2008/0147507 | A1 | 6/2008 | Langhammer |
| 2008/0162382 | A1 | 7/2008 | Clayton et al. |
| 2008/0208707 | A1 | 8/2008 | Erbey et al. |
| 2008/0215354 | A1 | 9/2008 | Halverson et al. |
| 2008/0263152 | A1 | 10/2008 | Daniels et al. |
| 2008/0300959 | A1 | 12/2008 | Sinha et al. |
| 2009/0037287 | A1 | 2/2009 | Baitalmal et al. |
| 2009/0037492 | A1 | 2/2009 | Baitalmal et al. |
| 2009/0063112 | A1 | 3/2009 | Hader et al. |
| 2009/0171716 | A1 | 7/2009 | Suenderhauf et al. |
| 2009/0171818 | A1 | 7/2009 | Penning et al. |
| 2009/0172699 | A1 | 7/2009 | Jungkind et al. |
| 2009/0189743 | A1 | 7/2009 | Abraham et al. |
| 2009/0192858 | A1 | 7/2009 | Johnson |
| 2010/0070324 | A1 | 3/2010 | Bock et al. |
| 2010/0070331 | A1 | 3/2010 | Koegler et al. |
| 2010/0070336 | A1 | 3/2010 | Koegler et al. |
| 2010/0070395 | A1 | 3/2010 | Elkeles et al. |
| 2010/0070555 | A1 | 3/2010 | Duparc et al. |
| 2010/0100464 | A1 | 4/2010 | Ellis et al. |
| 2010/0138269 | A1 | 6/2010 | Cirpus et al. |
| 2011/0252395 | A1 | 10/2011 | Charisius et al. |

FOREIGN PATENT DOCUMENTS

| WO | WO 2004/083984 | 9/2004 |
|---|---|---|
| WO | WO 2005/114381 | 12/2005 |

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports™ 13,000 MAS 90® for WINDOWS® Shipments in First Nine Months of Availability"; PR Newswire; Apr. 28, 1997.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyer's Guide to Software for Purchasing 2000.(Directory)"; Purchasing, vol. 129, No. 1; p. 179; Jul. 13, 2000.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. And OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

"Hudson's Bay Company Realizes Fast ROI with the Oracle E-Business Suite"; PR Newswire; New York; Jan. 15, 2002; p. 1.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Non A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com/docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages (Ref.: 20017-0105WO1).

International Preliminary Report on Patentability issued in International Application No. PCT/EP2006/012625; Jul. 1, 2008; 7 pages (Ref.: 20017-0105WO1).

International Search Report and Written Opinion of the International Searching Authority issued in International Application No. PCT/EP2006/012614; Mar. 16, 2007; 7 pages (Ref.: 20017-0107WO1).

International Preliminary Report on Patentability issued in International Application No. PCT/US2006/012614; Jul. 1, 2008; 6 pages (Ref.: 20017-0107WO1).

International Search Report and Written Opinion of the International Searching Authority issued in International Application No. PCT/EP2006/012618; Apr. 3, 2007; 8 pages (Ref.: 20017-0110WO1).

International Preliminary Report on Patentability issued in International Application No. PCT/EP2006/012618; Jul. 1, 2008; 7 pages (Ref.: 20017-0110WO1).

International Search Report and Written Opinion of the International Searching Authority issued in International Application No. PCT/EP2006/012613; May 3, 2007; 6 pages (Ref.: 20017-0112WO1).

International Preliminary Report on Patentability issued in International Application No. PCT/EP2006/012613; Jul. 1, 2008; 6 pages (Ref.: 20017-0112WO1).

International Search Report and Written Opinion of the International Searching Authority issued in International Application No. PCT/EP2006/012624; Mar. 30, 2007; 9 pages (Ref.: 20017- 0151WO1).

International Preliminary Report on Patentability issued in International Application No. PCT/EP2006/012624; Jul. 1, 2008; 8 pages (Ref.: 20017-0151WO1).

International Search Report and Written Opinion of the International Searching Authority issued in International Application No. PCT/EP2006/012623; May 7, 2007; 8 pages (Ref.: 20017-0161WO1).

International Preliminary Report on Patentability issued in International Application No. PCT/EP2006/012623; Jul. 1, 2008; 7 pages (Ref.: 20017-0161WO1).

International Search Report and Written Opinion of the International Searching Authority issued in International Application No. PCT/EP2006/012620; Mar. 21, 2007; 7 pages (Ref.: 20017-0162WO1).

International Preliminary Report on Patentability issued in International Application No. PCT/EP2006/012620; Jul. 1, 2008; 6 pages (Ref.: 20017-0162WO1).

International Search Report and Written Opinion of the International Searching Authority issued in International Application No. PCT/EP2006/012619; Apr. 19, 2007; 8 pages (Ref.: 20017-0164WO1).

International Preliminary Report on Patentability issued in International Application No. PCT/EP2006/012619; Jul. 1, 2008; 7 pages (Ref.: 20017-0164WO1).

International Search Report and Written Opinion of the International Searching Authority issued in International Application No. PCT/EP2006/012621; Apr. 19, 2007; 8 pages (Ref.: 20017-0165WO1).

International Preliminary Report on Patentability issued in International Application No. PCT/EP2006/012621; Jul. 1, 2008; 7 pages (Ref.: 20017-0165WO1).

International Search Report and Written Opinion of the International Searching Authority issued in International Application No. PCT/EP2007/002835; Aug. 9, 2007; 12 pages (Ref.: 20017-0168WO1).

International Preliminary Report on Patentability issued in International Application No. PCT/EP2007/002835; Sep. 30, 2008; 8 pages (Ref.: 20017-0168WO1).

Communication Pursuant to Article 94(3) EPC issued in European Application No. 06841224.6; May 15, 2009; 8 pages (Ref.: 20017-0151EP1).

Communication Pursuant to Article 94(3) EPC issued in European Application No. 06847009.5; May 15, 2009; 10 pages (Ref.: 20017-0161EP1).

Communication Pursuant to Article 94(3) EPC issued in European Application No. 07007130.3; Dec. 5, 2008; 6 pages (Ref.: 23067-0054EP1).

Extended European Search Report issued in European Application No. 07007130.3; Oct. 5, 2007; 6 pages (Ref.: 23067-0054EP1).

Office Action issued in U.S. Appl. No. 11/323,041, Apr. 30, 2009; 26 pages (Ref.: 20017-0151001).

Office Action issued in U.S. Appl. No. 11/322,612, May 11, 2009; 24 pages (Ref.: 20017-0165001).

Office Action issued in U.S. Appl. No. 11/322,772, Mar. 25, 2009; 12 pages (Ref.: 20017-0109001).

Office Action issued in U.S. Appl. No. 11/323,590, Jan. 9, 2009; 23 pages (Ref.: 23067-0045001).

Office Action issued in U.S. Appl. No. 11/396,288, Jan. 2, 2009; 18 pages (Ref.: 20017-0154001).

Office Action issued in U.S. Appl. No. 11/396,288, Apr. 15, 2008; 26 pages (Ref.: 20017-0154001).

Office Action issued in U.S. Appl. No. 11/397,029, Jul. 21, 2009; 28 pages; (Ref.: 20017-0168001).

Office Action issued in U.S. Appl. No. 11/323,040, Jul. 24, 2009; 35 pages; (Ref.: 20017-0164001).

Office Action issued in U.S. Appl. No. 11/323,590, Jul. 10, 2009; 32 pages; (Ref.: 23067-0045001).

Office Action issued in U.S. Appl. No. 11/322,816, Jul. 23, 2006; 41 pages; (Ref.: 23067-0047001).

Office Action issued in U.S. Appl. No. 11/322,851, Sep. 2, 2009; 32 pages; (Ref.: 20017-0162001).

Office Action issued in U.S. Appl. No. 11/323,590, Dec. 30, 2009; 31 pages; (Ref.: 23067-0045001).

Office Action issued in U.S. Appl. No. 11/322,482, Jan. 7, 2010; 19 pages; (Ref.: 23067-0044001).

Office Action issued in U.S. Appl. No. 11/322,772, Dec. 9, 2009; 14 pages; (Ref.: 20017-0109001).

Office Action issued in U.S. Appl. No. 11/323,039, Sep. 4, 2009; 36 pages; (Ref.: 20017-0161001).

Office Action issued in U.S. Appl. No. 11/323,634, Sep. 10, 2009; 15 pages; (Ref.: 23067-0046001).

Office Action issued in U.S. Appl. No. 11/322,383, Nov. 12, 2009; 29 pages; (Ref.: 20017-0112001).

Office Action issued in U.S. Appl. No. 11/396,258, Nov. 25, 2009; 9 pages; (Ref.: 20017-0158001).

Office Action issued in U.S. Appl. No. 12/333,085, Jun. 25, 2009; 9 pages; (Ref.: 23067-0066001).

Office Action issued in U.S. Appl. No. 11/396,288, Aug. 19, 2009; 20 pages; (Ref.: 20017-0154001).

Notice of Allowance issued in U.S. Appl. No. 11/322,610, filed Mar. 1, 2010; 12 pages (Ref.: 20017-0106001).

International Search Report and Written Opinion of the International Searching Authority issued in International Application No. PCT/EP2007/002841; Aug. 16, 2007; 12 pages (Ref.: 20017-0170WO1).

International Preliminary Report on Patentability under Chapter I issued in International Application No. PCT/EP2007/002841; Sep. 30, 2008; 8 pages (Ref.: 20017-0170WO1).

"American Software Announces ASP Pricing Model for It's a-Applications Expense Business Solution"; PR Newswire; Mar. 6, 2000; 2 pages.

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

"Cendant Announces Comprehensive Online Travel Booking to Meet President Bush's eTravel Initiative"; PR Newswire; Jul. 9, 2002; 3 pages.

Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.

Duc et al.; "Uniform Object Modeling Methodology and Reuse of Real Time System Using UML"; EMSOFT '05; Sep. 19-22, 2005; pp. 44-47.

Gomaa et al.; "Model Based Software Design and Adaption"; International Workshop on Software Engineering for Adaptive and Self-Managing Systems (SEAMS '07); IEEE; 2007; 10 pages.

Huang, S. et al.; "Computer-Assisted Supply Chain Configuration Based on Supply Chain Operations Reference (SCOR) Model"; Computers & Industrial Engineering 48; 2005; pp. 377-394.

Intuit Canada Ltd.; "Startup Guide—QuickBooks Basic for Windows, QuickBooks Pro for Windows, QuickBooks Premier for Windows"; 2002; 230 pages.

Lambert et al.; "Supply Chain Metrics"; International Journal of Logistics Management; vol. 12, No. 1; 2001; pp. 1-19.

Lockamy III, et al.; "Linking SCOR Planning Practices to Supply Chain Performance"; International Journal of Operationgs & Production Management; vol. 24, No. 12; pp. 1192-1218.

mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

Schultz, G.J.; "Keeping SCOR on Your Supply Chain: Basic Operations Reference Model Updates with the Times"; Information Strategy: The Executive's Journal; Summer 2003; pp. 12-20.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

Office Action issued in U.S. Appl. No. 11/396,312 on Mar. 30, 2010; 23 pages.

Office Action issued in U.S. Appl. No. 11/322,611 on Mar. 31, 2010; 17 pages.

Notice of Allowance issued in U.S. Appl. No. 11/322,610 on Jun. 14, 2010; 6 pages.

Office Action issued in U.S. Appl. No. 11/322,398 on Apr. 2, 2010; 39 pages.

Office Action issued in U.S. Appl. No. 11/322,383; May 12, 2010; 23 pages.

Office Action issued in U.S. Appl. No. 11/322,382 on Mar. 29, 2010; 28 pages.

Office Action issued in U.S. Appl. No. 11/323,041 on Mar. 19, 2010; 26 pages.

Advisory Action issued in U.S. Appl. No. 11/323,041 on Jun. 7, 2010; 3 pages.

Notice of Allowance issued in U.S. Appl. No. 11/396,288; May 20, 2010; 15 pages.

Notice of Allowance issued in U.S. Appl. No. 11/396,258 on Mar. 31, 2010; 9 pages.

Supplemental Notice of Allowance issued in U.S. Appl. No. 11/396,258 on May 19, 2010; 8 pages.

Office Action issued in U.S. Appl. No. 11/396,236 on Mar. 31, 2010; 20 pages.

Office Action issued in U.S. Appl. No. 11/323,039; Apr. 14, 2010; 15 pages.

Office Action issued in U.S. Appl. No. 11/322,851; May 12, 2010; 15 pages.

Office Action issued in U.S. Appl. No. 11/323,040; Apr. 29, 2010; 17 pages.

Office Action issued in U.S. Appl. No. 11/322,612; Apr. 1, 2010; 23 pages.

Notice of Allowance issued in U.S. Appl. No. 11/397,026 on Mar. 29, 2010; 17 pages.

Notice of Allowance issued in U.S. Appl. No. 12/233,554 on May 14, 2010; 11 pages.

Notice of Allowance issued in U.S. Appl. No. 11/967,865 on Mar. 31, 2010; 16 pages.

Office Action issued in U.S. Appl. No. 11/323,634; Apr. 2, 2010; 9 pages.

Office Action issued in U.S. Appl. No. 11/322,816; Apr. 15, 2010; 27 pages.

Office Action issued in U.S. Appl. No. 11/396,327 on Apr. 1, 2010; 26 pages.

Office Action issued in U.S. Appl. No. 12/333,085; Mar. 23, 2010; 5 pages.

Cascallar, Eduardo et al.; "Assessment in the Evaluation of Self-Regulation as a Process"; Educational Psychology Review; vol. 18, No. 3; Sep. 2006; pp. 297-306.

Cool, David W.; "Activity Fun Accounting"; School Business Affairs; vol. 49, No. 6; Jun. 1983; pp. 50-52.

Office Action issued in U.S. Appl. No. 11/396,312 on Sep. 10, 2010, 23 pages.

Office Action issued in U.S. Appl. No. 11/322,611 on Sep. 16, 2010; 21 pages.

Notice of Allowance issued U.S. Appl. No. 11/332,610 on Sep. 23, 2010; 6 pages.

Office Action issued U.S. Appl. No. 11/332,772; Jul. 12, 2010; 18 pages.

Notice of Allowance issued in U.S. Appl. No. 11/322,398 on Jul. 23, 2010; 38 pages.

Notice of Allowance issued in U.S. Appl. No. 1/322,398 on Sep. 20, 2010; 6 pages.

Notice of Allowance issued in U.S. Appl. No. 11/396,258 on Jul. 28, 2010; 9 pages.

Office Action issued U.S. Appl. No. 11/322,845; Jul. 15, 2010; 16 pages.

Advisory Action issued in U.S. Appl. No. 11/322,612; Jun. 24, 2010; 3 pages.

Supplemental Notice of Allowance issued in U.S. Appl. No. 11/397,026 on Jul. 9, 2010; 4 pages.

Notice of Allowance issued in U.S. Appl. No. 11/397,026 on Jul. 26, 2010; 6 pages.

Notice of Allowance issued in U.S. Appl. No. 12/233,554 on Sep. 17, 2010; 10 pages.

Notice of Allowance issued in U.S. Appl. No. 11/968,054 on Sep. 7, 2010; 11 pages.

Office Action issued in U.S. Appl. No. 12/233,557 on Sep. 16, 2010; 16 pages.

Notice of Allowance issued in U.S. Appl. No. 12/233,534 on Jun. 24, 2010; 15 pages.

Notice of Allowance issued in U.S. Appl. No. 12/327,354 on Jun. 25, 2010; 16 pages.

Notice of Allowance issued in U.S. Appl. No. 11/322,482; Jul. 13, 2010; 5 pages.

Office Action issued in U.S. Appl. No. 11/323,590; Jun. 21, 2010; 25 pages.

Office Action issued in U.S. Appl. No. 11/967,483; Aug. 20, 2010; 10 pages.

Notice of Allowance issued in U.S. Appl. No. 11/333,085; Sep. 13, 2010; 8 pages.

Ferscha et al.; "A Light-Weight Component Model for Peer-to-Peer Applications"; IEEE; Mar. 23, 2004.

Flissi et al.; "A Component-based Software Infrastructure for Ubiquitous Computing"; IEEE; Jul. 4, 2005.

SAP AG; "Sap NetWeaver Visual Composer: User Guide (SAP NetWeaver Visual Composer release 6.0)"; Document version 1.1; pp. 1-208.

Strelich, Thomas P. et al.; "Simulation-Based Transformation with the Service Integration/Interoperation Infrastructure"; Technology Review Journal; Fall/Winter 2005; pp. 99-115.

Notice of Allowance issued in U.S. Appl. No. 11/322,610 on Dec. 22, 2010; 6 pages.

Notice of Allowance issued in U.S. Appl. No. 11/322,398 on Oct. 29, 2010; 18 pages.

Notice of Allowanced issued in U.S. Appl. No. 11/322,398 on Nov. 15, 2010; 20 pages.
Notice of Allowance issued in U.S. Appl. No. 11/396,288; Dec. 28, 2010; 4 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Notice of Allowance issued in U.S. Appl. No. 12/233,534 on Oct. 20, 2010; 15 pages.
Notice of Allowance issued in U.S. Appl. No. 12/327,354 on Oct. 18, 2010; 16 pages.
Notice of Allowance issued in U.S. Appl. No. 11/967,865 on Oct. 6, 2010; 6 pages.
Office Action issued in U.S. Appl. No. 11/322,973 on Dec. 7, 2010; 13 pages.
Office Action issued in U.S. Appl. No. 11/404,147 on Nov. 24, 2010; 27 pages.
Bin et al.; "Component Model Optimization for Distributed Real-Time Embedded Software"; IEEE International Conference on Systems, Man and Cybernetics; Oct. 13, 2004; 6 pages.
Cox et al.; "A Formal Model for Component Based Software"; IEEE; Aug. 7, 2002; 8 pages.
Gould; "Integrating the Manufacturing Enterprise"; Automative Design & Production; 119, 1; ABI/INFORM Global; Jan. 2007; 3 pages.
Papazoglou et al; "Service-Oriented Computing Research Road Map"; http://infolab.uvt.nl/pub/papazogloump-2006-96.pdf; Mar. 1, 2006; 29 pages.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PMBWFAQ_50070686_en.pdf.
Notice of Allowance issued in U.S. Appl. No. 11/322,610 on Mar. 31, 2011; 6 pages.
Notice of Allowance issued in U.S. Appl. No. 1/322,382 on Jan. 6, 2011; 7 pages.
Notice of Allowance issued in U.S. Appl. No. 11/396,250 on Mar. 2, 2011; 13 pages.
Notice of Allowance issued in U.S. Appl. No. 11/322,845; Apr. 8, 2011; 8 pages.
Notice of Allowance issued in U.S. Appl. No. 11/397,026 on Mar. 3, 2011; 6 pages.
Notice of Allowance issued in U.S. Appl. No. 12/233,554 on Feb. 22, 2011; 7 pages.
Office Action issued in U.S. Appl. No. 12/233,550 on Jan. 12, 2011; 29 pages.
Office Action issued in U.S. Appl. No. 12/233,557 on Mar. 4, 2011; 19 pages.
Notice of Allowance issued in U.S. Appl. No. 12/233,534 on Jan. 31, 2011; 15 pages.
Notice of Allowance issued in U.S. Appl. No. 12/327,354 on Feb. 1, 2011; 16 pages.
Notice of Allowance issued in U.S. Appl. No. 11/396,327 on Nov. 30, 2010; 28 pages.
Notice of Allowance issued in U.S. Appl. No. 12/233,462 on Feb. 2, 2011; 11 pages.
Office Action issued in U.S. Appl. No. 11/967,483 on Mar. 4, 2011; 6 pages.
Office Action issued in U.S. Appl. No. 12/233,417 on Apr. 7, 2011; 32 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on May 27, 2011; 15 pages.
Office Action issued in U.S. Appl. No. 11/404,147 on Aug. 4, 2011; 26 pages.
Office Action issued in U.S. Appl. No. 12/332,965 on Oct. 11, 2011; 6 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Notice of Allowance issued in U.S. Appl. No. 12/233,534 on May 16, 2011; 12 pages.
Notice of Allowance issued in U.S. Appl. No. 11/322,382 on Jul. 25, 2011; 5 pages.
Notice of Allowanced issued in U.S. Appl. No. 11/322,398 on May 27, 2011; 21 pages.
Office Action issued in U.S. Appl. No. 11/322,383 on May 12, 2010; 23 pages.
Office Action issued in U.S. Appl. No. 11/322,383 on Nov. 12, 2009; 23 pages.
Office Action issued in U.S. Appl. No. 11/396,288 on Oct. 17, 2011; 38 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Office Action issued in U.S. Appl. No. 11/323,040 on Jul. 26, 2011; 34 pages.
Notice of Allowance issued in U.S. Appl. No. 11/397,026 on Jul. 20, 2011; 8 pages.
Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.

Office Action issued in U.S. Appl. No. 12/233,458 on Oct. 12, 2011; 19 pages.
Office Action issued in U.S. Appl. No. 11/967,489 on Sep. 28, 2011; 7 pages.
Office Action issued in U.S. Appl. No. 12/233,489 on May 13, 2011; 15 pages.
Office Action issued in U.S. Appl. No. 11/967,393 on Apr. 15, 2011; 12 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
"IDe Partners with Journyx to Offer Customers Best-in-Class Time Management Solution"; PR Newswire; Mar. 8, 2005; Business Dateline.
Kremic, Tibor; "Outsourcing Decision Support: A Survey of Benefits, Risks, and Decision Factor"; Supply Chain Management; V. 11; 2006; pp. 467-482.
Meseroll, Robert; "Data Mining Navy Flight"; IEEE Autotestcom 2007; Sep. 2007; pp. 476-481.
Sarjoughian et al.; "CoSMoS: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Notice of Allowance issued in U.S. Appl. No. 12/233,462 on Dec. 12, 2011; 6 pages.
Notice of Allowance issued in U.S. Appl. No. 12/233,462 on Apr. 5, 2012; 7 pages.
Office Action issued in U.S. Appl. No. 12/233,289 on Oct. 27, 2011; 15 pages.
Notice of Allowance issued in U.S. Appl. No. 12/233,289 on Feb. 15, 2012; 11 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Notice of Allowance issued in U.S. Appl. No. 12/327,701 on Apr. 6, 2012; 9 pages.
Notice of Allowance issued in U.S. Appl. No. 12/233,087 on Mar. 30, 2012; 30 pages.
Notice of Allowance issued in U.S. Appl. No. 12/233,534 won Dec. 28, 2011; 7 pages.
Notice of Allowanced issued in U.S. Appl. No. 11/322,398 on Oct. 18, 2011; 7 pages.
Examiner's Answer to Appeal Brief issued in U.S. Appl. No. 11/396,236 on Nov. 10, 2011; 19 pages.
Notice of Allowance issued in U.S. Appl. No. 11/396,250 on Dec. 7, 2011; 6 pages.
Notice of Allowance issued in U.S. Appl. No. 11/396,258 on Feb. 3, 2012; 12 pages.
Office Action issued in U.S. Appl. No. 11/396,252 on Nov. 10, 2011; 18 pages.
Notice of Allowance issued in U.S. Appl. No. 11/322,851 on Mar. 1, 2012; 9 pages.
Notice of Allowance issued in U.S. Appl. No. 11/322,845; Nov. 13, 2011; 9 pages.
Notice of Allowance issued in U.S. Appl. No. 11/397,026 on Nov. 4, 2011; 8 pages.
Notice of Allowance issued in U.S. Appl. No. 11/397,026 on Feb. 23, 2012; 8 pages.
Notice of Allowance issued in U.S. Appl. No. 12/233,520 on Nov. 10, 2011; 22 pages.
Office Action issued in U.S. Appl. No. 11/967,489 on Feb. 6, 2012; 9 pages.
Notice of Allowance issued in U.S. Appl. No. 11/967,393 on Nov. 9, 2011; 9 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.
Notice of Allowance issued in U.S. Appl. No. 12/233,075 on Mar. 22, 2012; 25 pages.

\* cited by examiner

PROVIDING CUSTOMER RELATIONSHIP MANAGEMENT APPLICATION AS ENTERPRISE SERVICES

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes a services architecture design that provides enterprise services having accounting functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having customer relationship management functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
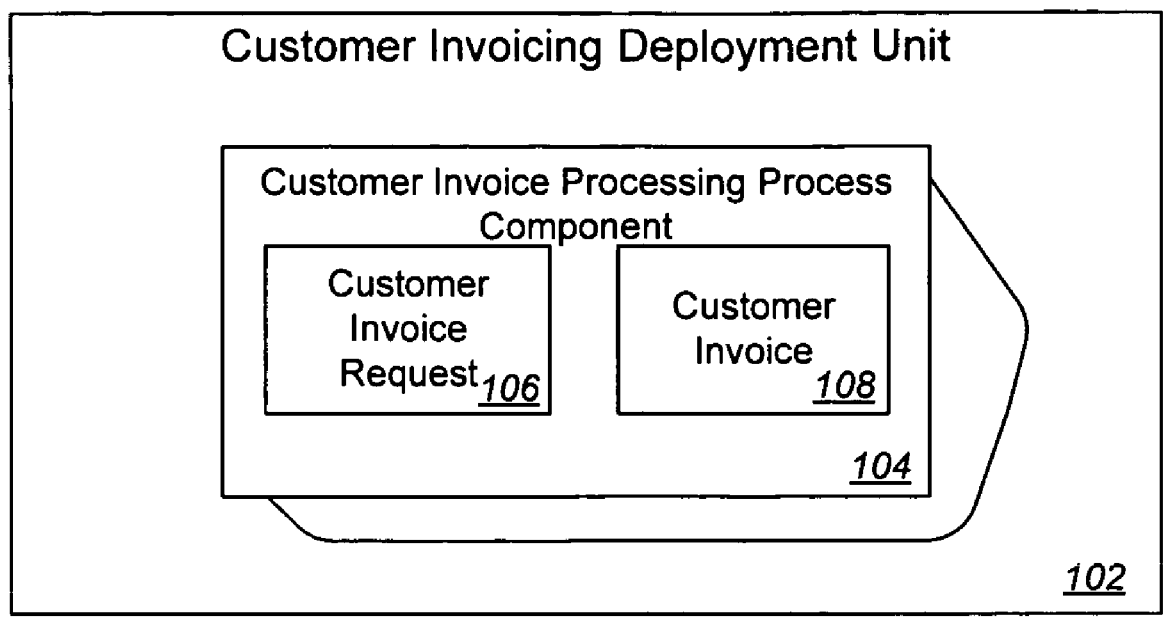
FIGS. 1A, 1B and 1C collectively illustrate a high-level view of a software architectural design and implementation of a suite enterprise software services having customer relationship management functionality.
Figure 1B:
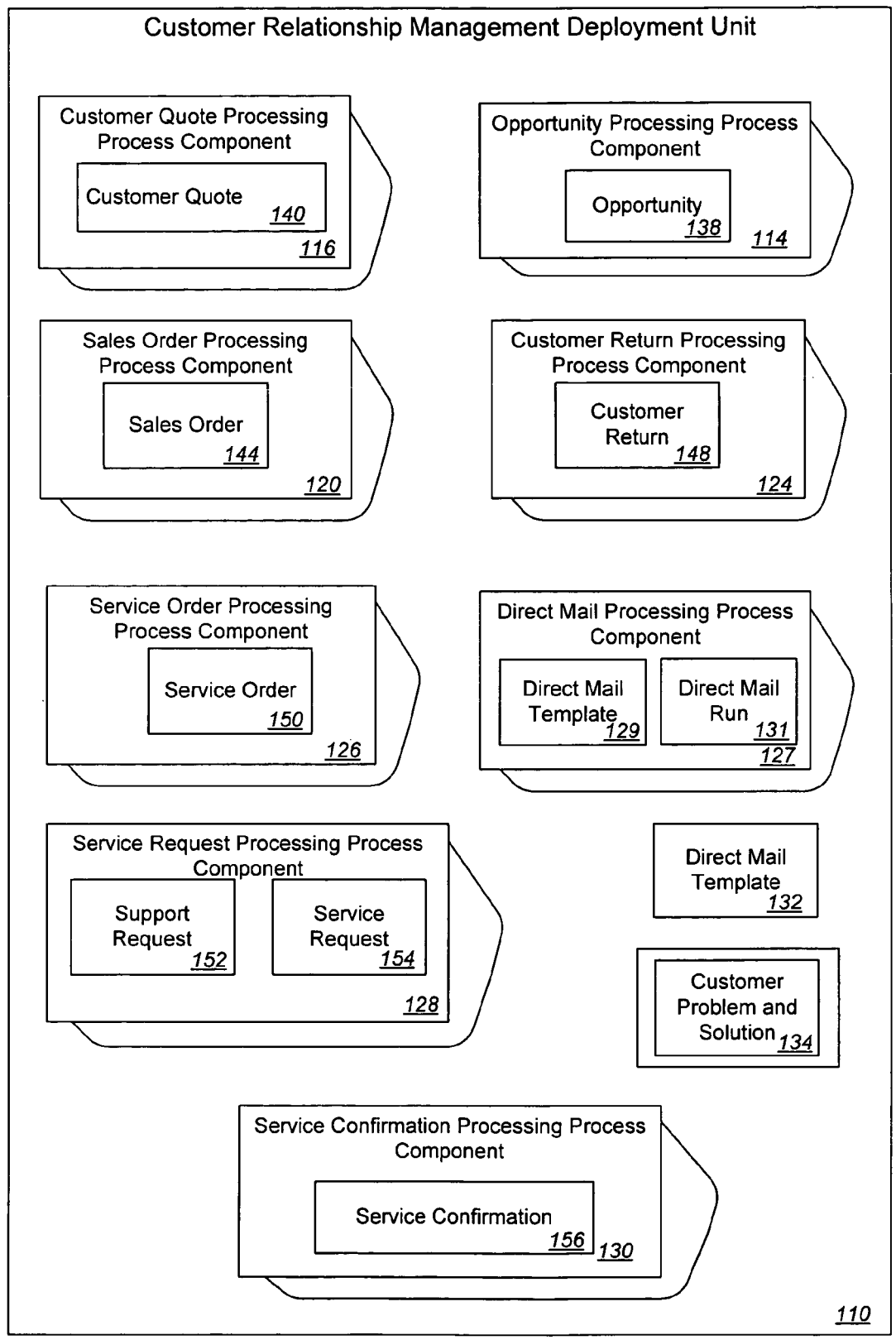
Figure 1C:
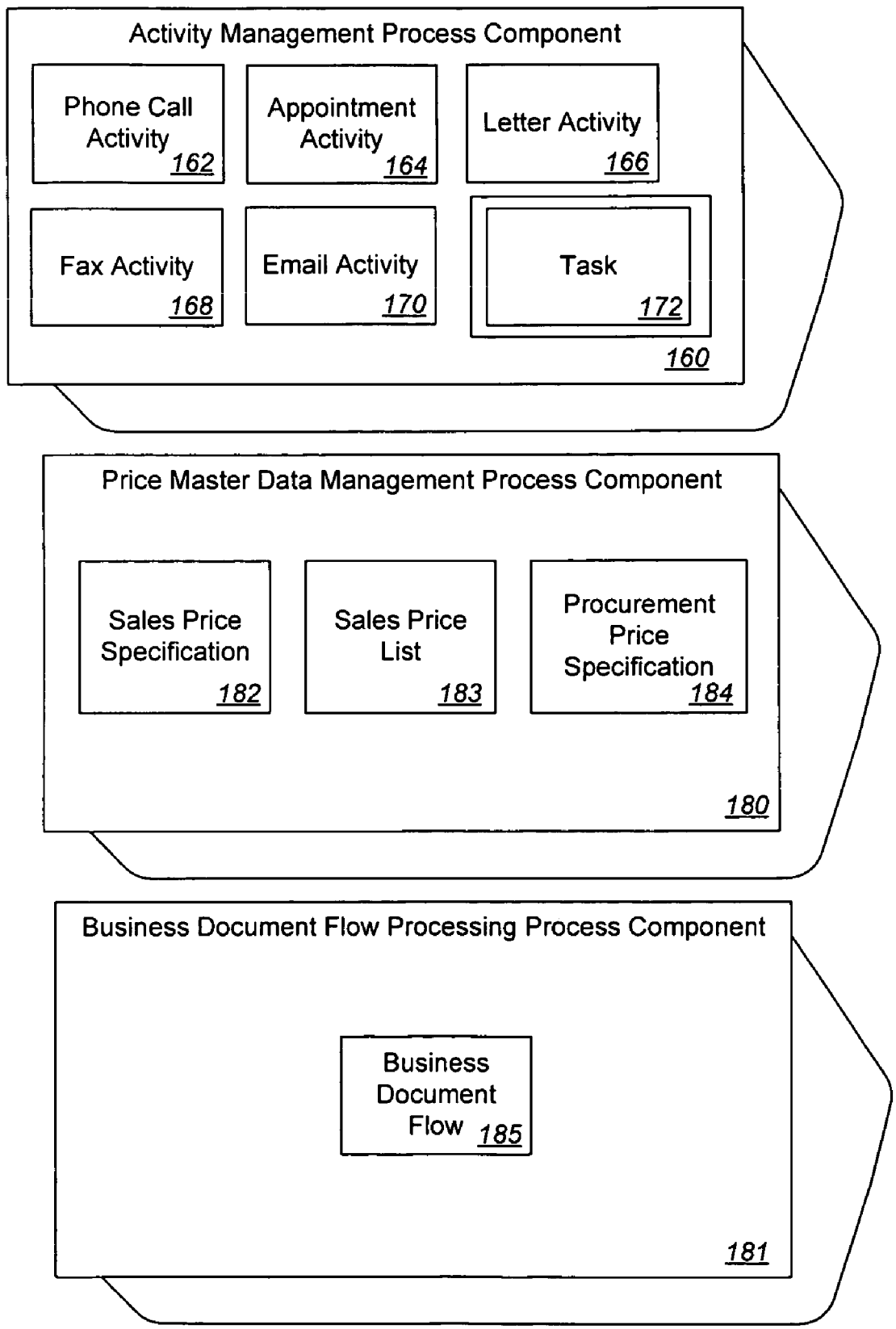

FIGS. 1A, 1B and 1C collectively illustrate a high-level view of a software architectural design, and of application software implementations of the design, that provides a suite of enterprise service operations, which can be organized into interfaces, having customer relationship management application functionality. The software corresponding to FIGS. 1A and 1B in one implementation is for deployment in an application layer of an application server, while the software corresponding to FIG. 1C is for deployment in a foundation layer, which will be described below.

The elements of the architecture include the business object, the process component, the service operation (or simply, the operation), the service interface, the message, and the deployment unit. The elements can also include process agents and reuse service components. These will be generally described below.

In one implementation, the software is implemented to be deployed on an application platform that includes a foundation layer that contains all fundamental entities that can used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term is generally clear from the context, so the distinction will be made explicitly only when necessary. Properly implemented, business objects are implemented free of redundancies.

Business objects are further categorized as business process objects, master data objects, mass data run objects, dependent objects, and transformed objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have its own persistency.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also include the service interface, which may be referred to simply as an interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIGS. 1A, 1B and 1C collectively illustrate a high-level view of a software architectural design and implementation of a suite enterprise software services having customer relationship management functionality.

As shown in FIG. 1A, a Customer Invoicing deployment unit 102 includes a Customer Invoicing process component 104, a Customer Invoice Request business object 106 and a Customer Invoice business object 108.

As shown in FIG. 1B, a Customer Relationship Management deployment unit 110 includes an Opportunity Processing process component 114, a Customer Quote Processing process component 116, a Sales Order Processing process component 120 a Customer Return Processing process component 124, a Service Order Processing process component 126, a Direct Mail Processing process component 127, a Service Request Processing process component 128, and a Service Confirmation Processing process component 130. The Customer Invoice deployment unit 110 also includes a Direct Mail Template business object 132 and a Customer Problem and Solution master data object 134.

The Opportunity Processing process component 114 includes an Opportunity business object 138. The Customer Quote Processing process component 116 includes a Customer Quote business object 140. The Sales Order Processing process component 120 includes a Sales Order business object 144. The Customer Return Processing process component 124 includes a Customer Return business object 148. The Service Order Processing process component 126 includes a Service Order business object 150. The Direct Mail Processing process component 127 includes a Direct Mail Template business object 129 used to automatically generate personalized mail in order to contact customers and prospects and a Direct Mail Run business object 131 that is a specification of a serial letter sent as personalized mail to selected customers and/or prospects by means of multiple communication channels. The Service Request Processing process component 128 includes a Support Services business object 152 and a Service Request business object 154. The Service Confirmation Processing process component 130 includes a Service Confirmation business object 156.

As shown in FIG. 1C, an Activity Management process component 160, a Price Master Data management process component 180, and a Business Document Flow Processing process component 181 in the foundation layer may also be used. The Activity Management process component 160 may be used to record public interactions, that is, activities undertaken on behalf of a particular company. The Activity Management process component 160 includes a Phone Call Activity business object 162, an Appointment Activity business object 164, a Letter Activity business object 166, a Fax Activity business object 168, an Email Activity business object 170 and a Task master data object 172.

The Phone Call Activity business object 162 is the type of activity that records telephone interactions that are undertaken by employees on behalf of their company. The Appointment Activity business object 164 includes different types of planned activities that are maintained in an employee's calendar, including external appointments and scheduled meetings with other business parties. The Letter Activity business object 166 is the type of activity that records messages written on paper by employees on behalf of their company. The Fax Activity business object 168 is the type of activity that records documents or graphics transmitted over a telecommunications facility by employees on behalf of their company. The Email Activity business object 170 is the type of activity that records communication between employees on behalf of their company via the Internet. The Task master data object 172 is a piece of daily business work or a notification about a business event.

The Price Master Data management process component 180 includes a Sales Price Specification business object 182, a Sale Price List business object 183, and a Procurement Price Specification business object 184. The Sales Price Specification business object 182 is a specification of a price, a discount, or a surcharge that is used indirectly using pricing in sales and service documents. The specification is defined for a combination of properties and is valid for a specific period. The Sales Price List business object is a list of price specifications with respect to common identifying criteria. The Procurement Price Specification business object 184 is the specification of a price, discount or surcharge to be used in procurement documents. The specification is defined for a combination of properties and is valid for a specific period of time.

The Business Document Flow Processing process component 181 includes a Business Document Flow transformed business object 185. The Business Document Flow transformed business objects 185 is a view on the flow of business transaction documents. The Business Document Flow transformed business object 185 may use a synchronous Request Business Document Flow outbound message agent to invoke a Query Related Business Document operation. The Query Related Business Document may update the Business Document Flow Processing process component 181. Additionally, the Business Document Flow transformed business object may receive an update from a Find Related business Document operation.

FIGS. 2A, 2B, 2C and 2D are block diagrams collectively showing the Customer Invoicing Processing process component 104 (FIG. 1). For convenience in describing this process component, a number of other process components are shown in the figures; these other process components are not part of the process component being described. These other process components are the Sales Order Processing process component 120, the Customer Return Processing process component 124, the Service Order Processing process component 126, the Service Request Processing process component 128, the Service Confirmation Processing process component 130, a Supplier Invoice process component 203, an Outbound Delivery Processing process component 205, a Sales Contract Processing process component 207, an Accounting process component 209, a Due Item Processing process component 211, a Credit Management process component 213, a Supplier Invoice Processing at Customer processing component 215, a Payment Processing process component 218, and a Confirmation and Inventory process component 220. These other process components are used to represent software external to the process component in describing its interactions with the external software; however, while the external software can be implemented as such process components, this is not required.

A Maintain Customer Invoice Request operation 222 is included in a Request Invoicing In interface 223. The Maintain Customer Invoice Request operation 222 sends an update of a customer invoice request using a Maintain Customer Invoice Request asynchronous outbound process agent 224 to update the Customer Invoice Request business object 106. For example, the operation 222 can create, delete or cancel a customer invoice request.

Figure 2A:
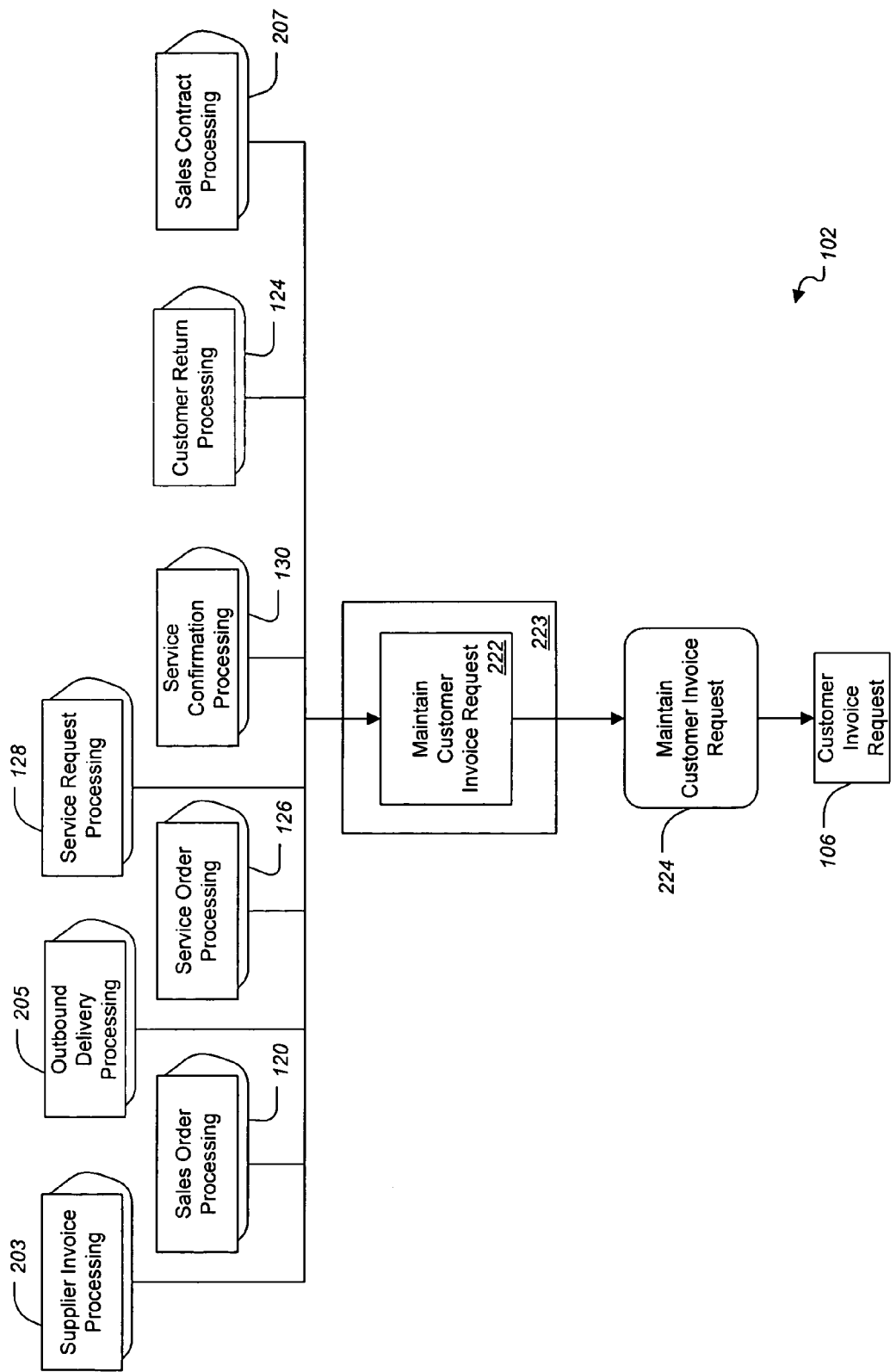
FIGS. 2A, 2B, 2C and 2D are block diagrams collectively showing a customer invoice processing process component.
Figure 2B:
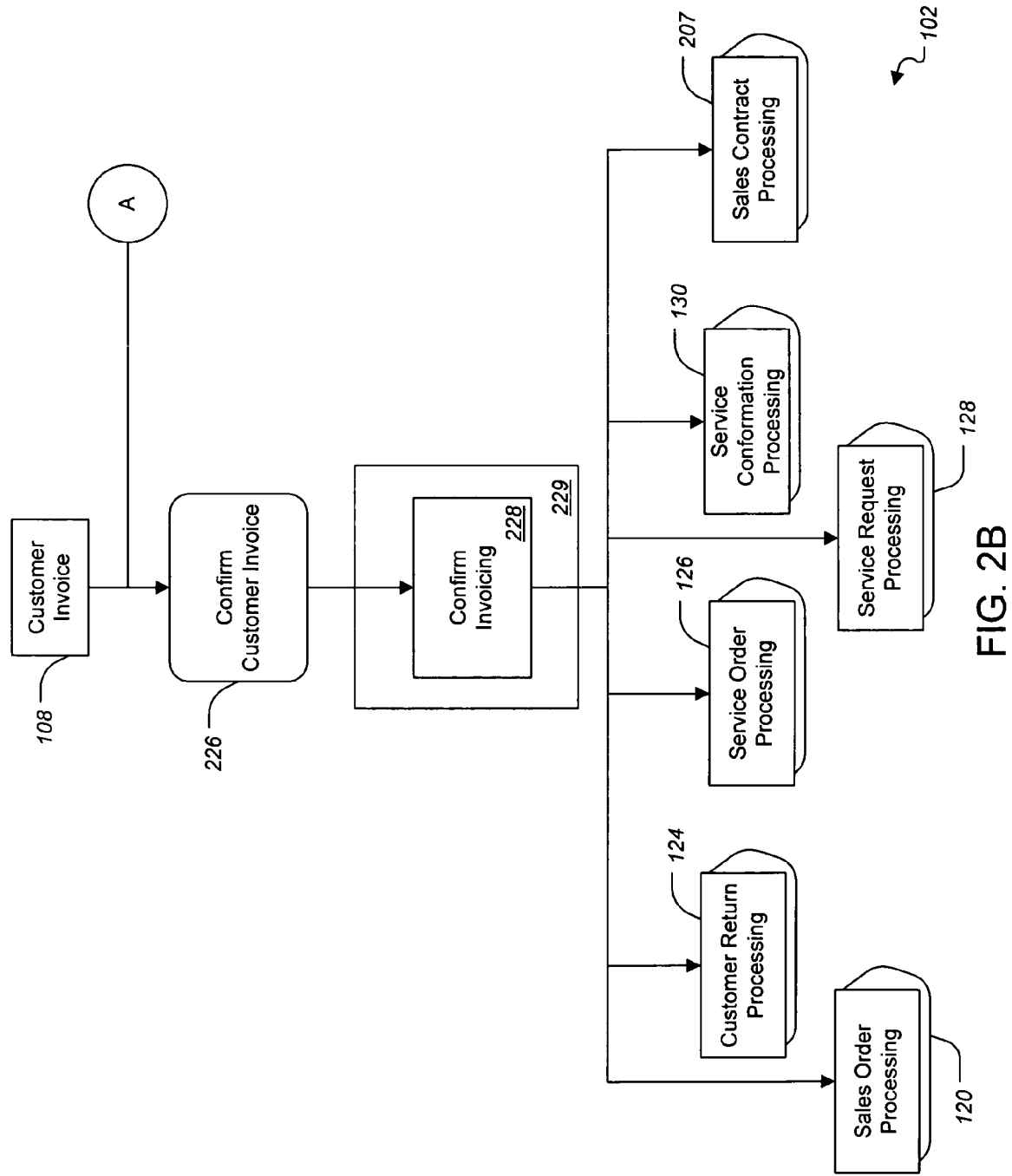

As shown in FIG. 2B, a Customer Invoice business object 108 can use a Confirm Customer Invoice asynchronous outbound process agent 226 to invoke a Confirm Invoicing operation 228. The Confirm Invoicing operation 228 is included in a Request Invoicing Out interface 229. The Confirm Invoicing operation 228 may update multiple process components about an invoice confirmation. These include a Sales Order Processing process component 120, a Customer Return Processing process component 124, a Service Order Processing process component 126, a Service Request Processing process component 128, a Service Confirmation Processing process component 130, and a Sales Contract Processing process component 207.

The Customer Invoice business object 108 may also invoke several operations (depicted by the letter A) that will be discussed in the description for FIG. 2C and FIG. 2D.

Figure 2C:
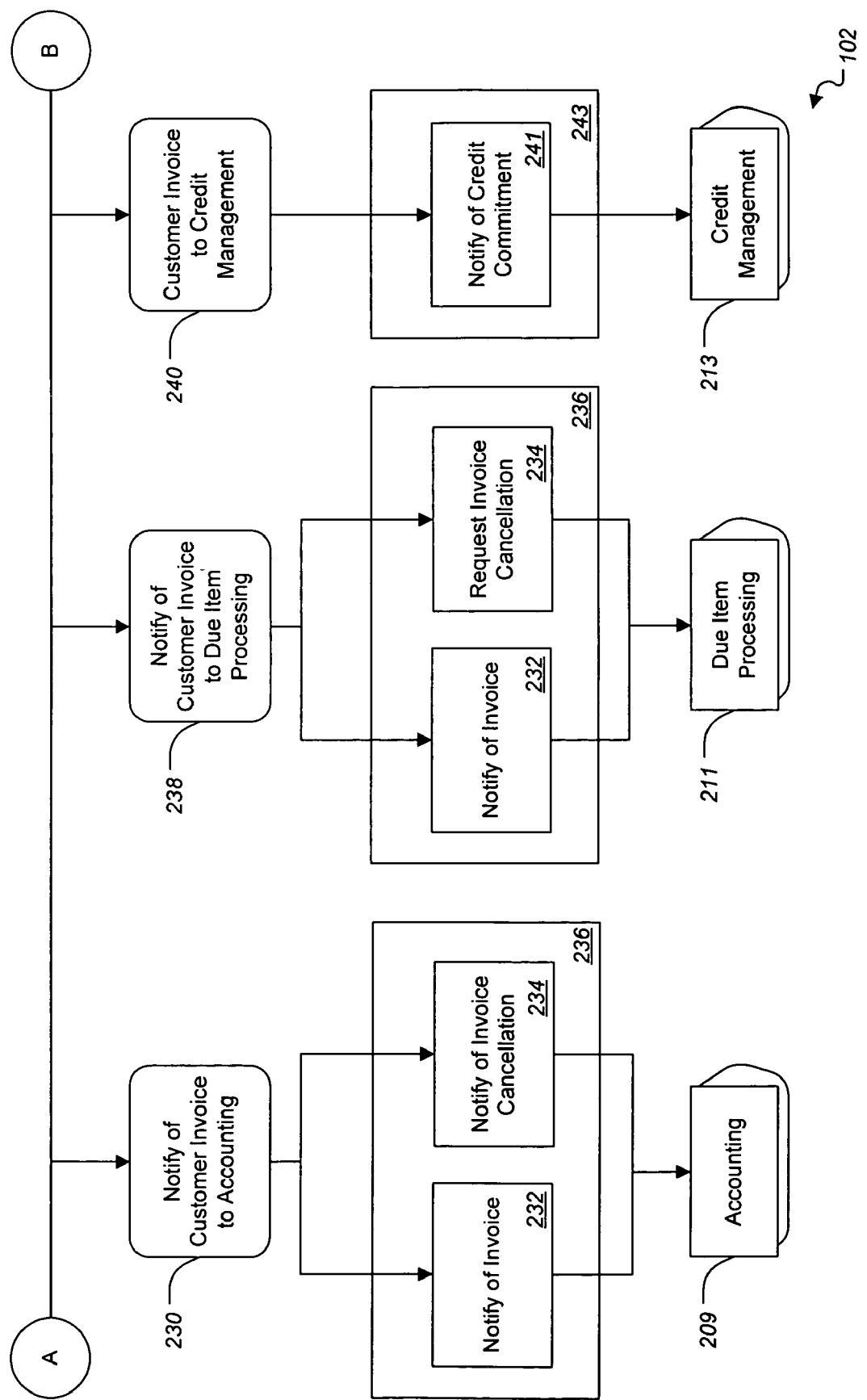

As shown in FIG. 2C, the Customer Invoice business object 108 may use a Notify of Customer Invoice to Accounting asynchronous outbound process agent 230 to invoke a Notify of Invoice operation 232 or a Notify of Invoice Cancellation operation 234. The Notify of Invoice operation 232 and the Notify of Invoice Cancellation operation 234 are included in an Invoice Accounting Out interface 236 and may send an update to the Accounting process agent 209.

The Customer Invoice business object 108 may also use a Notify of Customer Invoice to Due Item Processing asynchronous outbound process agent 238 to invoke the Notify of Invoice operation 232 or the Notify of Invoice Cancellation operation 234. The operations 232 and 234 may update the Due Item Processing process component 211.

In addition, the Customer Invoice business object 108 may use a Customer Invoice to Credit Management Processing asynchronous outbound process agent 240 to invoke the Notify of Credit Commitment operation 241. The Notify of Credit Commitment operation 241 is included in a Credit Usage Out interface 243 and may update the Credit Management process component 213.

Figure 2D:
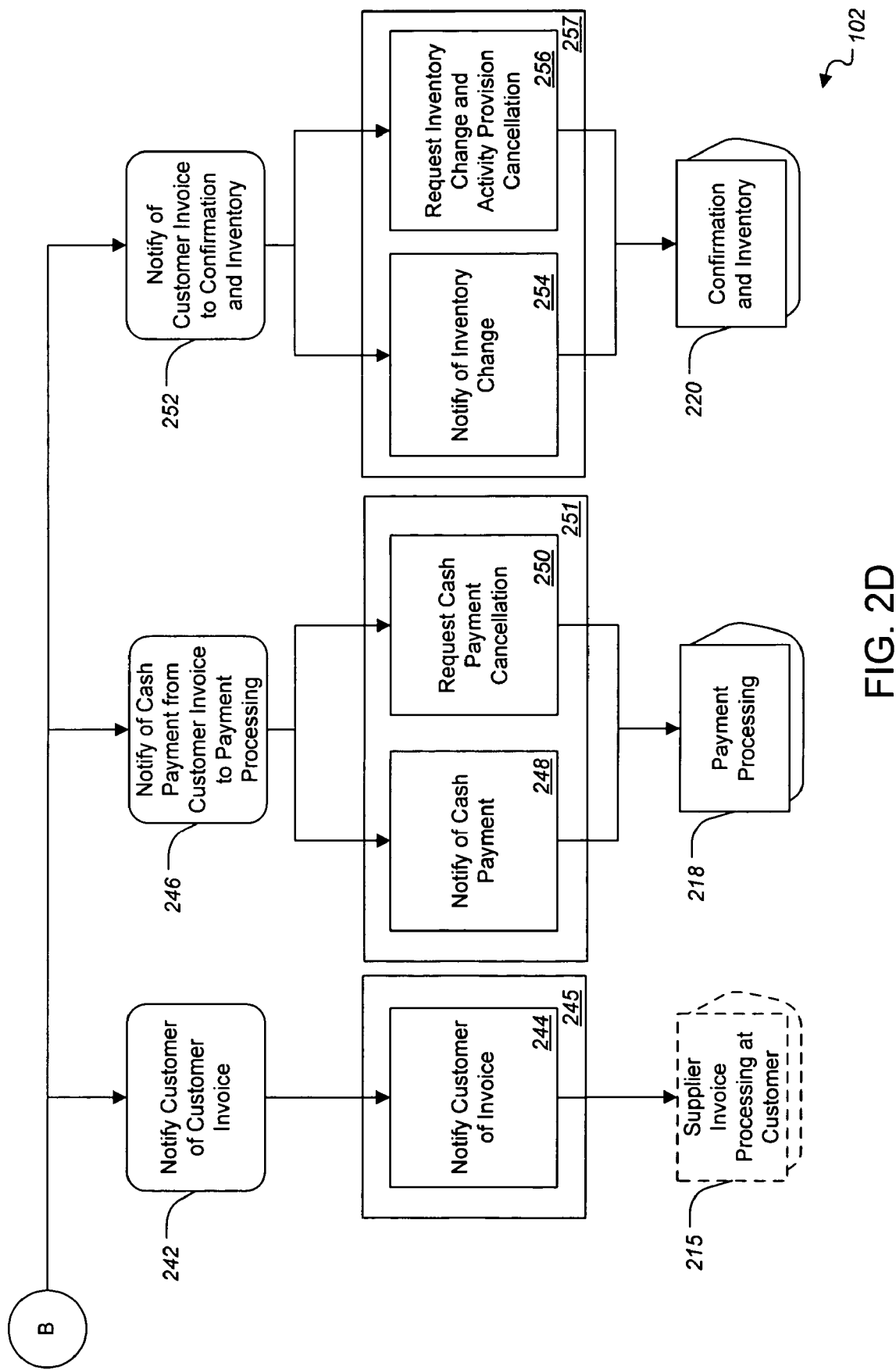

As shown in FIG. 2D, the Customer Invoice business object may use a Notify Customer of Customer Invoice asynchronous outbound process agent 242 to invoke a Notify Customer of Invoice operation 244. The Notify Customer of Invoice operation 244 is included in an Invoicing Out interface 245 and may update a Supplier Invoice Processing at Customer process component 215. The Customer Invoice business object may also use a Notify of Cash Payment from Customer Invoice to Payment Processing asynchronous outbound process agent 246 to invoke a Notify of Cash Payment operation 248, or a Request Cash Payment Cancellation operation 250. Both operations are included in a Cash Payment Out interface 251 and may be used to update the Payment Processing process component 218. The Customer Invoice business object can additionally use a Notify of Customer Invoice to Confirmation and Inventory asynchronous outbound process agent 252 to invoke a Notify of Inventory Change operation 254, or a Request Inventory Change and Activity Provision Cancellation operation 256. Both operations (254, 256) are included in an Inventory Change and Activity Confirmation Accounting Out interface 257 and may be used to update the Confirmation and Inventory process agent 220.

Figure 3:
FIG. 3 is a block diagram showing an opportunity processing process component.

FIG. 3 is a block diagram showing an Opportunity processing process component 114. The opportunity processing process component 114 includes an Opportunity business object 138 that may represent a recognized possibility for sales of products or services. An opportunity can result from a trade fair, a sales deal, or a bid invitation. The Opportunity business object 138 summarizes a variety of business information, such as the expected sales revenue or expected net value.

Figure 4A:
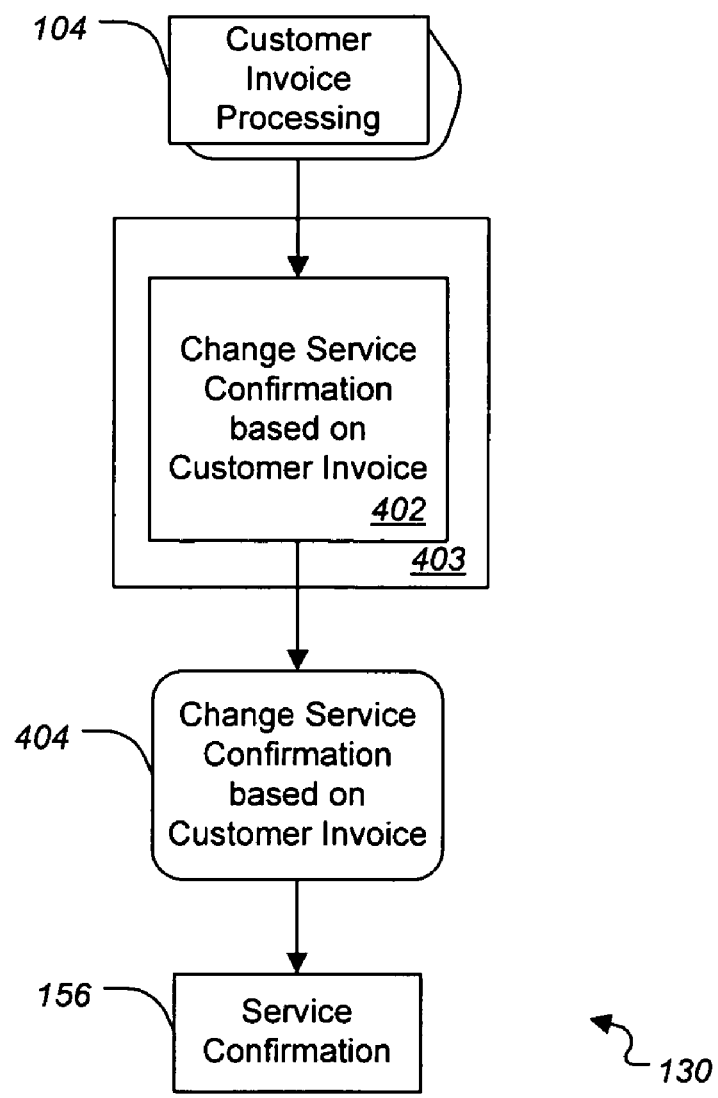
FIGS. 4A and 4B are block diagrams collectively showing a service confirmation processing process component.
Figure 4B:
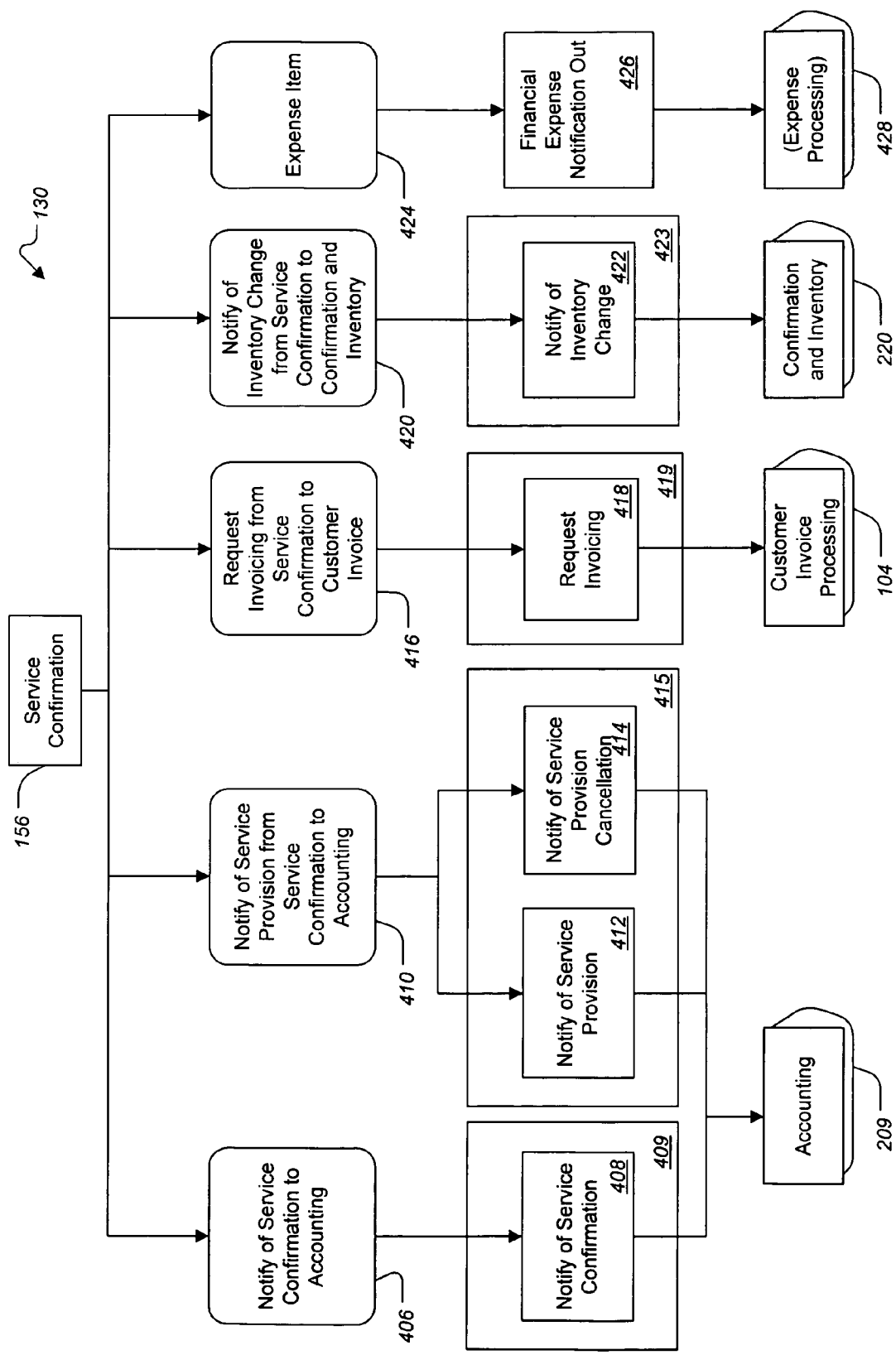

FIGS. 4A and 4B are block diagrams collectively showing a Service Confirmation Processing process component 130. As shown in FIG. 4A, the Customer Invoice Processing process component 104 may invoke a Change Service Confirmation based on Customer Invoice operation 402. The Change Service Confirmation based on Customer Invoice operation 402 is included in a Request Invoicing In interface 403. The change Service Confirmation based on Customer Invoice operation 402 may send an update to the Service Confirmation business object 156 using a Change Service Confirmation based on Customer Invoice asynchronous inbound process agent 404.

As shown in FIG. 4B, the Service Confirmation business object 156 may update several process components through various interfaces and operations. A Notify of Service Confirmation to Accounting asynchronous outbound process agent 406 may invoke a Notify of Service Confirmation operation 408 to update the Accounting process component 209. The Notify of Service Confirmation operation 408 is included in an Order Accounting Out interface 409. The Accounting process component 209 may also receive an update using a Notify of Service Provision from Service Confirmation to Accounting asynchronous outbound process agent 410. The process agent 410 may invoke a Notify of Service Provision operation 412 or a Notify of Service Provision Cancellation operation 414. Both operations (412, 414) are included in a Service Provision Accounting Out interface 415.

The Service Confirmation business object 156 may use a Request Invoicing from Service Confirmation to Customer Invoice asynchronous outbound process agent 416 to invoke a Request Invoicing operation 418. The Request Invoicing operation 418 is included in a Request Invoicing Out interface 419 and may update the Customer Invoice Processing process component 104.

The Service Confirmation business object 156 may also use a Notify of Inventory Change from Service Confirmation to Confirmation and Inventory asynchronous outbound process agent 420 to invoke a Notify of Inventory Change operation 422. The Notify of Inventory Change operation 422 is included in an Inventory Change Out interface 423 and may update the Confirmation and Inventory process component 220.

The Service Confirmation business object 156 may also use an Expense Item asynchronous outbound process agent 424 to invoke a Financial Expense Notification Out operation 426, which may update an Expense Processing process component 428.

Figure 5A:
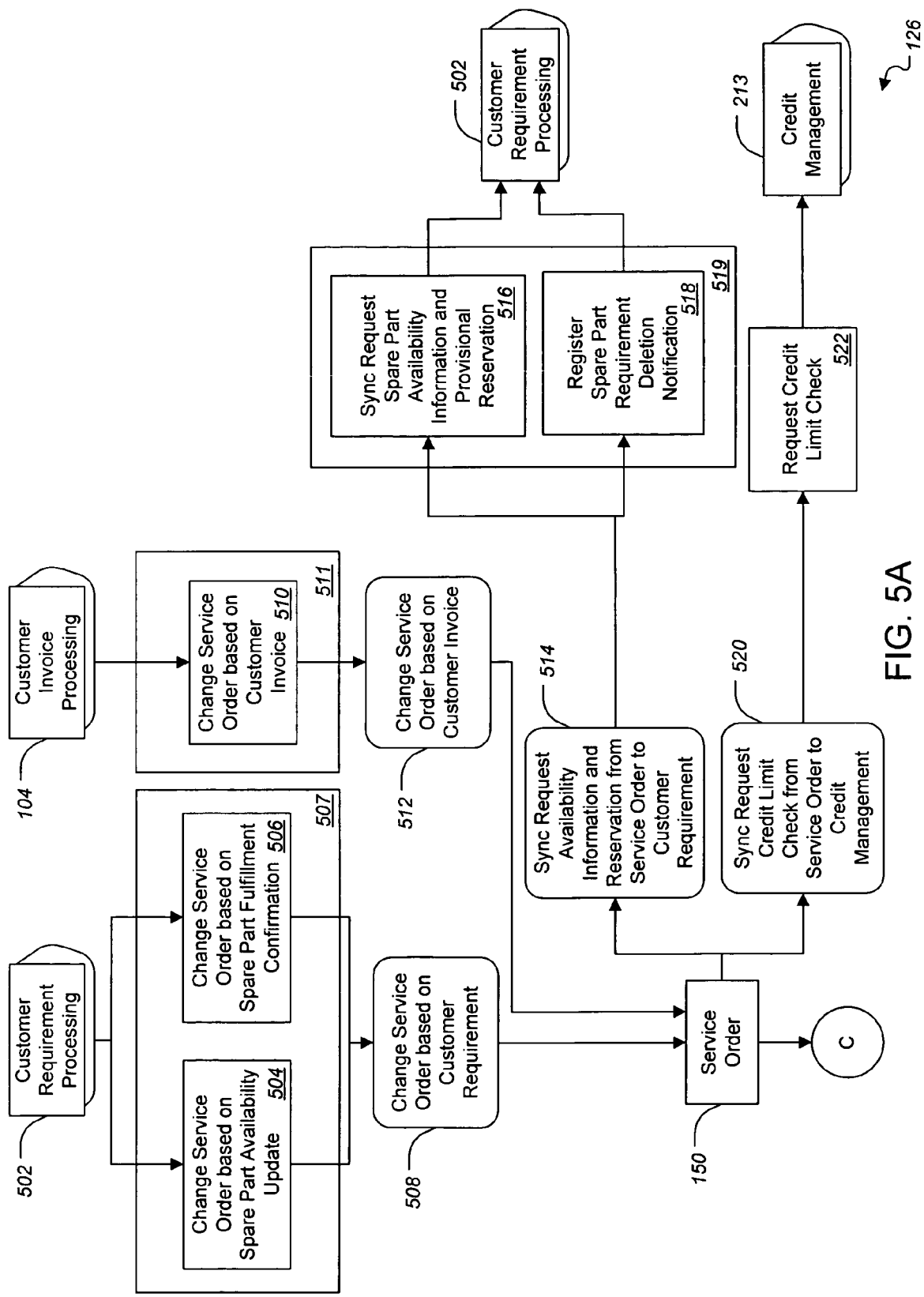
FIGS. 5A and 5B are block diagrams collectively showing a service order processing process component.
Figure 5B:
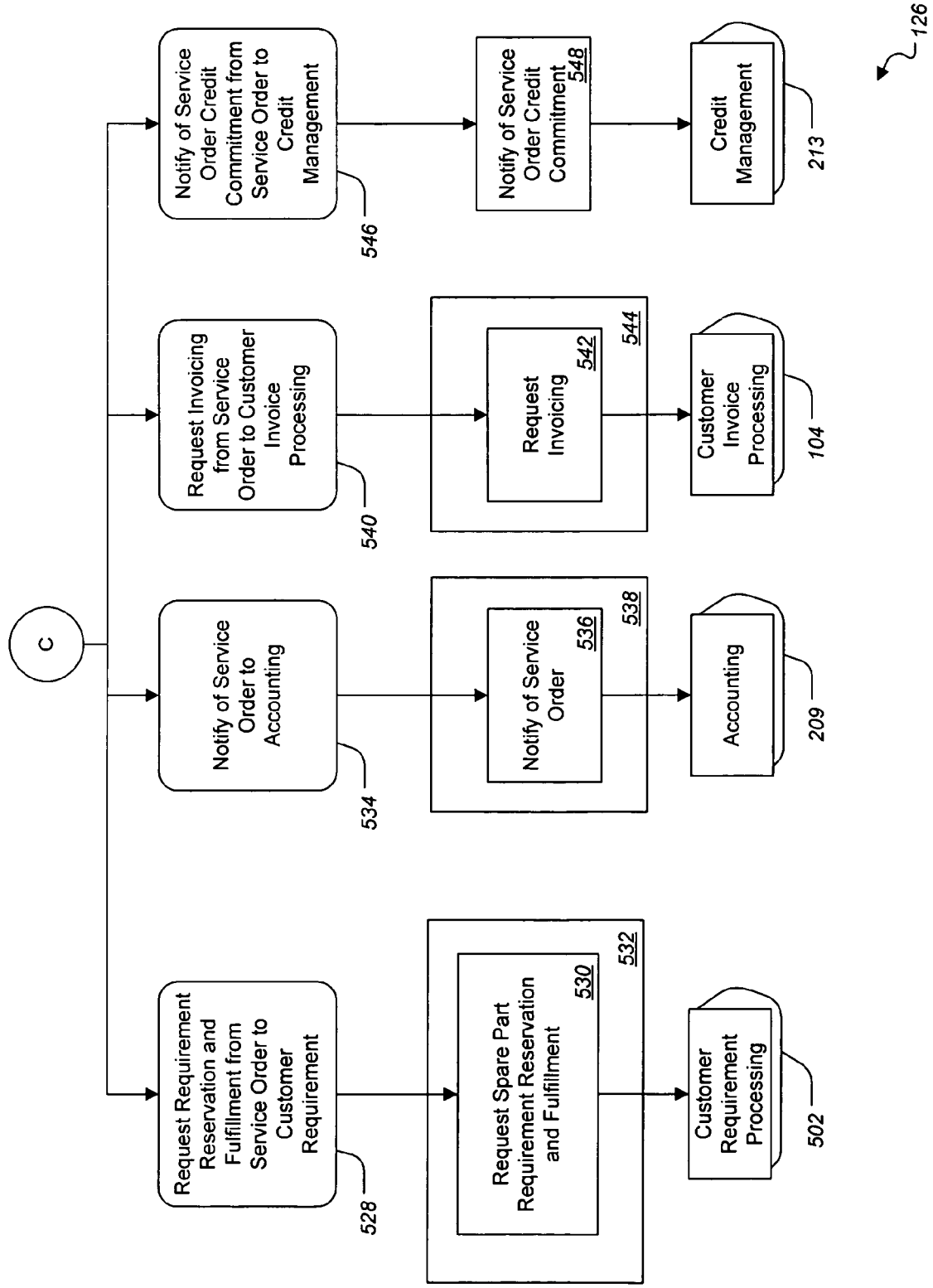

FIGS. 5A and 5B are block diagrams collectively showing a Service Order Processing process component 126. The Service Order Processing process component 126 may handle customer requests to a company for delivery of goods or services at a specific time. The request may be received by a sales area that is then responsible for fulfilling the contract.

As shown in FIG. 5A, a Customer Requirement Processing process component 502 may invoke a Change Service Order based on Spare Part Availability Update operation 504 or a Change Service Order based on Spare Part Fulfillment Confirmation operation 506. Both operations (504, 506) are included in a Fulfillment In interface 507. A Change Service Order based on customer Requirement asynchronous inbound process agent 508 may send an update to the Service Order business object 150.

The Customer Invoice Processing process component 104 may invoke a Change Service Order based on Customer Invoice operation 510. The Change Service Order based on Customer Invoice operation 510 is included in a Request Invoicing In interface 511. A Change Service Order based on Customer Invoice asynchronous inbound process agent 512 may send an update to the Service Order business object 150.

The Service Order business object 150 may use a Synchronous Request Availability Information and Reservation from Service Order to Customer Requirement process agent 514 to invoke a Synchronous Request Spare Part Availability Information and Provisional Reservation operation 516 or to invoke a Register Spare Part Requirement Deletion Notification operation 518. Bother operations (516, 518) are included in a Fulfillment Out interface 519 and may update the Customer Requirement Processing process component 502. The Service Order business object 150 may also use a Synchronous Request Credit Limit Check from Service Order to Credit Management process agent 520 to invoke a Request Credit Limit Check operation 522. The operation 522 may update the Credit Management process component 213.

As shown in FIG. 5B, the Service Order business object 150 may use a Request Requirement Reservation and Fulfillment from Service Order to Customer Requirement asynchronous outbound process agent 528 to invoke a Request Spare Part Requirement Reservation and Fulfillment operation 530. The Request Spare Part Requirement Reservation and Fulfillment operation 530 is included in a Fulfillment Out interface 532 and may send an update to the Customer Requirement Processing process component 502.

The Service Order business object 150 may use a Notify of Service Order to Accounting asynchronous outbound process agent 534 to invoke a Notify of Service Order operation 536. The Notify of Service Order operation 536 is included in an Order Accounting Out interface 538 and may update the Accounting process component 209.

The Service Order business object 150 may use a Request Invoicing from Service Order to Customer Invoice Processing asynchronous outbound process agent 540 to invoke a Request Invoicing operation 542. The Request Invoicing operation 542 is part of a Request Invoicing Out interface 544 and may update the Customer Invoice Processing process component 104.

The Service Order business object 150 may use a Notify of Service Order Credit Commitment from Service Order to Credit Management asynchronous outbound process agent 546 to invoke a Notify of Service Order Credit Commitment operation 548. The Notify of Service Order Credit Commitment operation 548 may update the Credit Management process component 213.

Figure 6A:
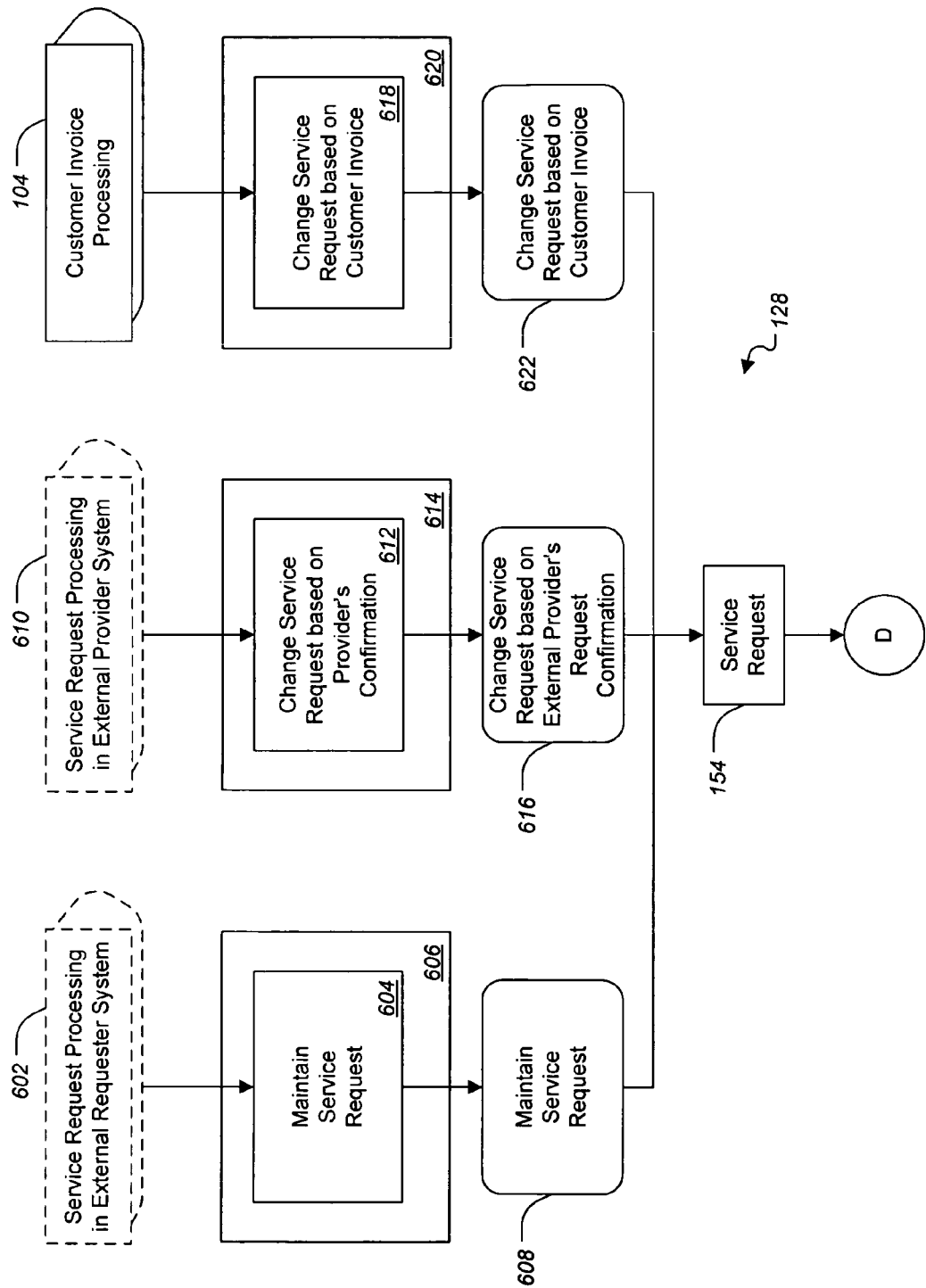
FIGS. 6A and 6B are block diagrams collectively showing a service request processing process component.
Figure 6B:
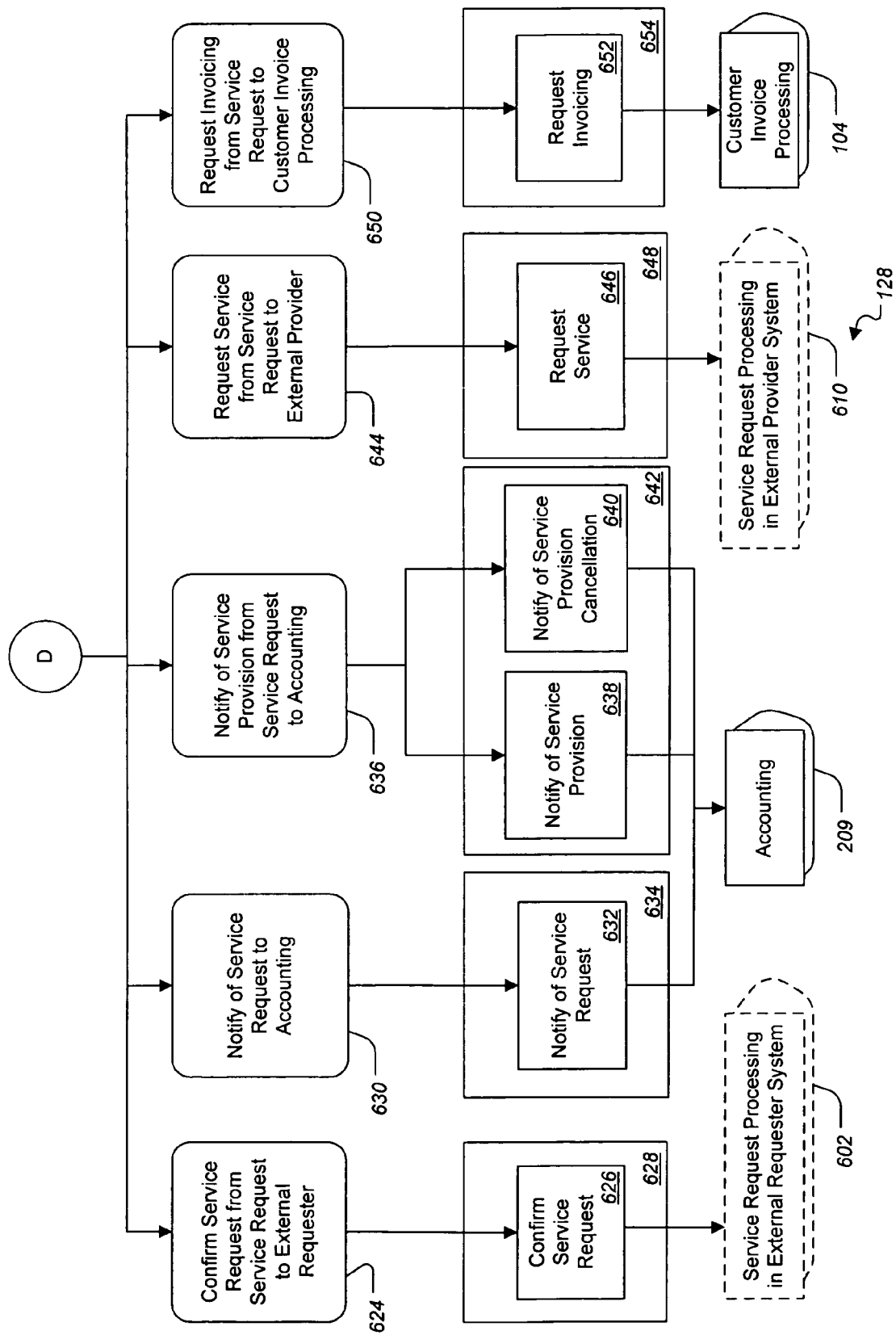

FIGS. 6A and 6B are block diagrams collectively showing a Service Request Processing process component 128. The Service Request Processing process component 128 covers requests from a customer to a service provider to answer a question or solve a problem about a product. As shown in FIG. 6A, a Service Request Processing in External Request System external process component 602 may invoke a Maintain Service Request operation 604. The Maintain Service Request operation 604 is included in an External Providing In interface 606 and may use a Maintain Service Request asynchronous outbound process agent 608 to update the Service Request business object 154.

A Service Request Processing in External Provider System external process component 610 may invoke a Change Service Request based on Provider's Confirmation operation 612. The Change Service Request based on Provider's Confirmation operation 612 is included in an External Requesting In interface 614 and may use a Change Service Request based on External Provider's Request Confirmation asynchronous outbound process agent 616 to update the Service Request business object 154.

The Customer Invoice Processing process component 104 may invoke a Change Service Request based on Customer Invoice operation 618. The Change Service Request based on Customer Invoice operation 618 is included in a Request Invoicing In interface 620 and may use a Change Service Request based on Customer Invoice 622 to update the Service Request business object 154.

As shown in FIG. 6B, the Service Request business object 154 may use a Confirm Service Request from Service Request to External Requester asynchronous outbound process agent 624 to invoke a Confirm Service Request operation 626. The Confirm Service Request operation 626 is included in an External Providing Out interface 628 and may update the Service Request Processing in External Requester System external process component 602.

The Service Request business object 154 may use a Notify of Service Request to Accounting asynchronous outbound process agent 630 to invoke a Notify of Service Request operation 632. The Notify of Service Request operation 632 is included in an Order Accounting Out interface 634 and may update the Accounting process component 209.

The Service Request business object 154 may use a Notify of Service Provision from Service Request to Accounting asynchronous outbound process agent 636 to invoke a Notify of Service Provision 638 or a Notify of Service Provision Cancellation operation 640. The Notify of Service Provision 638 and the Notify of Service Provision Cancellation operation 640 are included in a Service Provision Accounting Out interface 642 and may update the Accounting process component 209.

The Service Request business object 154 may use a Request Service from Service Request to External Provider asynchronous outbound process agent 644 to invoke a Request Service operation 646. The Request Service operation 646 is included in an External Requesting Out interface 648 and may update the Service Request Processing in External Provider System external process component 610.

The Service Request business object 154 may also use a Request Invoicing from Service Request to Customer Invoice Processing asynchronous outbound process agent 650 to invoke a Request Invoicing operation 652. The Request Invoicing operation 652 is included in a Request Invoicing Out interface 654 and may update the Customer Invoice Processing process component 104.

Figure 7:
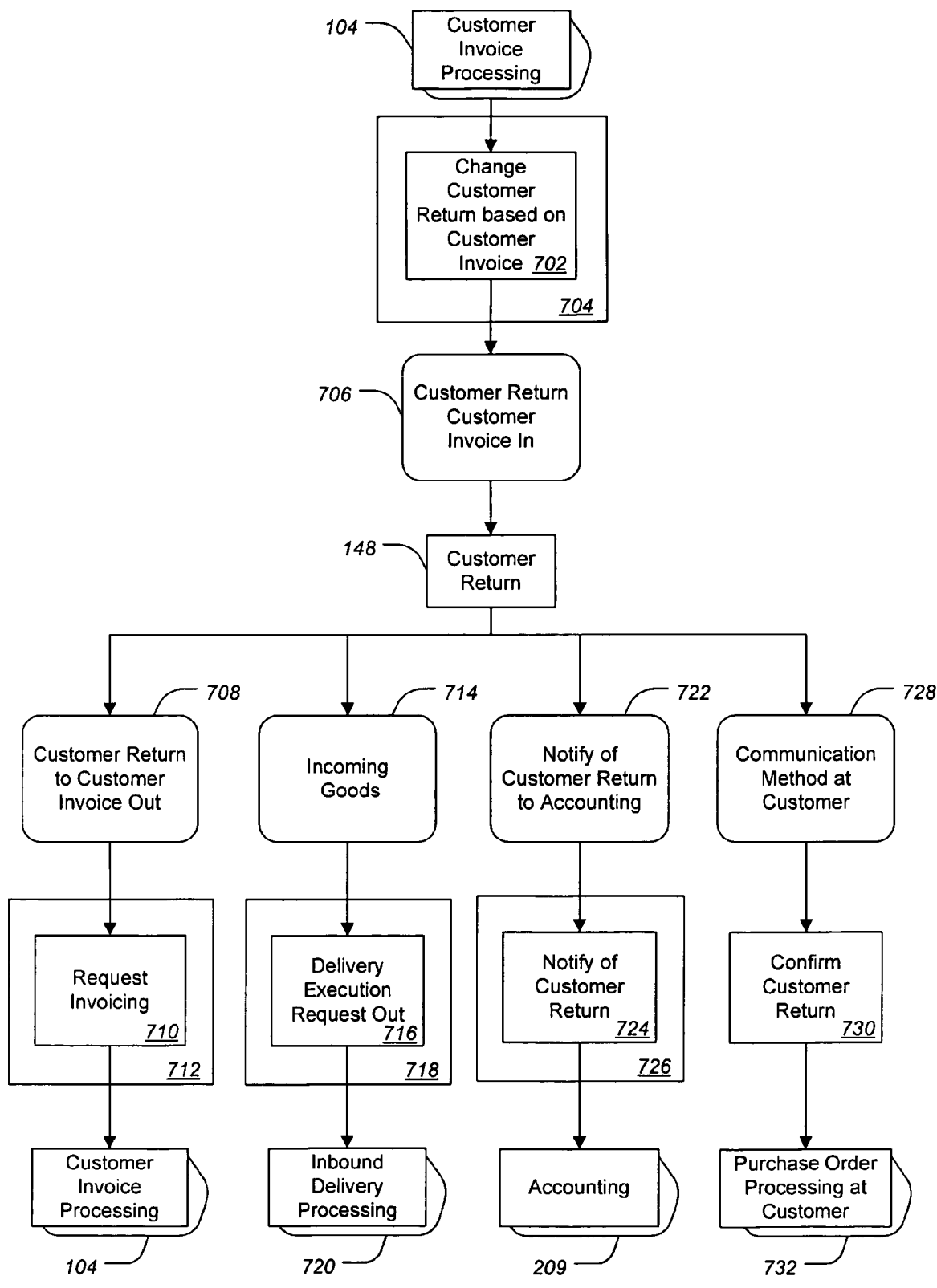
FIG. 7 is a block diagram of a customer return processing process component.

FIG. 7 is a block diagram showing a Customer Return Processing process component 124. The Customer Return Processing process component 124 represents a document initiating the return of a product from a customer back to a seller. The Customer Invoice Processing process component 104 may include details about the return and invoke a Change Customer Return based on Customer Invoice operation 702. The Change Customer Return based on Customer Invoice operation 702 is included in a Request Invoicing In interface 704 and may use a Customer Return Customer Invoice In asynchronous outbound process agent 706 to update the Customer Return business object 148.

The Customer Return business object 148 may use a Customer Return to Customer Invoice Out asynchronous outbound process agent 708 to invoke a Request Invoicing operation 710. The Request Invoicing operation 710 is included in a Request Invoicing Out interface 712 and may update the Customer Invoice Processing process component 104.

The Customer Return business object 148 may also use an Incoming Goods asynchronous outbound process agent 714 to invoke a Delivery Execution Request Out operation 716. The Delivery Execution Request Out operation 716 is included in a Delivery Execution Request Out interface 718 and may update an Inbound Delivery Processing process component 720.

The Customer Return business object 148 may also use a Notify of Customer Return to Accounting asynchronous outbound process agent 722 to invoke a Notify of Customer Return operation 724. The Notify of Customer Return operation 724 is included in an Order Accounting Out interface 726 and may update the Accounting process component 209.

The Customer Return business object 148 may also use a Communication Method at Customer asynchronous outbound process agent 728 to invoke a Confirm Customer Return operation 730 to update a Purchase Order Processing at Customer process component 732.

Figure 8:
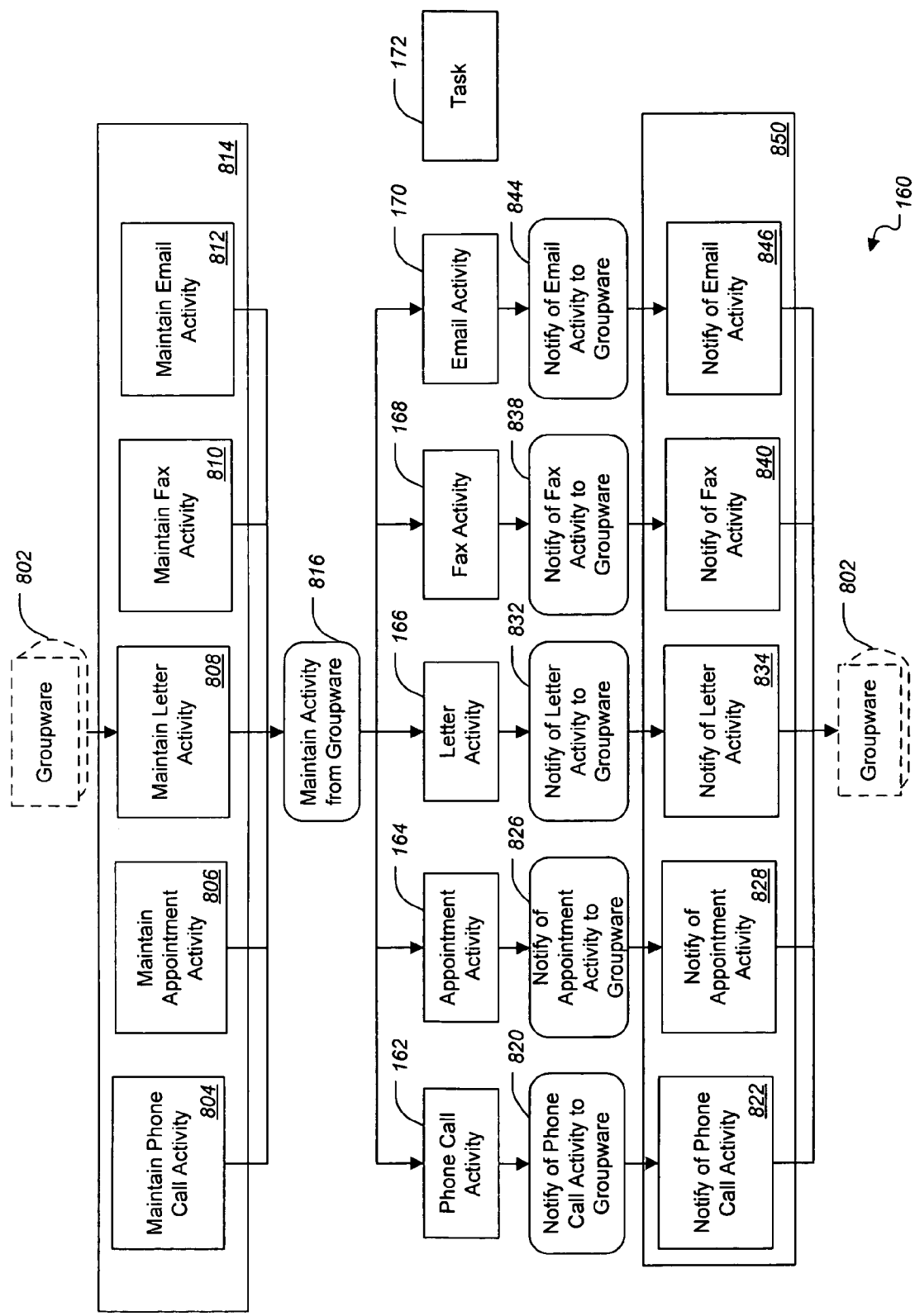
FIG. 8 is a block diagram of an activity management process component.

FIG. 8 is a block diagram showing an Activity Management process component 160. The Activity Management process component 160 may be used to record public interactions, that is, activities undertaken on behalf of a particular company. The process component 160 contains information about the business partner involved in the activity and the date on which it takes place. For example, a specific business activity may be a telephone call, a letter, or a customer visit. The Activity Management process may being with receiving information from a Groupware process component 802. The Groupware process component 802 is included in the foundation layer and is not part of a specific deployment unit.

A Task master data object 172 (FIG. 1C) may be used in the operations for the Activity Management process component 160. The Task master data object 172 is a piece of daily business work or a notification about a business event. It is created by an application and assigned to a user or a group of users. There are different categories of tasks, such as, business tasks, alerts, or notifications and each task carries a certain set of attributes and functions.

The Groupware process component 802 may invoke a Maintain Phone Call Activity operation 804, a Maintain Appointment Activity operation 806, a Maintain Letter Activity operation 808, a Maintain Fax Activity operation 810, or a Maintain Email Activity operation 812. The Maintain Phone Call Activity operation 804, the Maintain Appointment Activity operation 806, the Maintain Letter Activity operation 808, the Maintain Fax Activity operation 810, and the Maintain Email Activity operation 812 are included in an Activity Transmission Receiving In interface 814 and may use a Maintain Activity from Groupware asynchronous inbound process agent 816 to update several business objects. If the Phone Call Activity business object 162 receives an update, then a Notify of Phone Call Activity to Groupware asynchronous outbound process agent 820 may invoke a Notify of Phone Call Activity operation 822. If the Appointment Activity business object 164 receives an update, then a Notify of Appointment Activity to Groupware asynchronous outbound process agent 826 may invoke a Notify of Appointment Activity operation 828. If the Letter Activity business object 166 receives an update, then a Notify of Letter Activity to Groupware asynchronous outbound process agent 832 may invoke a Notify of Letter Activity operation 834. If the Fax Activity business object 168, then a Notify of Fax Activity to Groupware asynchronous outbound process agent 838 may invoke a Notify of Fax Activity operation 840. If the Email Activity business object 170 receives an update, then a Notify of Email Activity to Groupware asynchronous outbound process agent 844 may invoke a Notify of Email Activity operation 846. The Notify of Phone Call Activity 822, the Notify of Appointment Activity 828, the Notify of Letter Activity 834, the Notify of Fax Activity 840, and the Notify of Email Activity 846 are included in an Activity Transmission Sending Out interface 850 and may update the Groupware process component 802.

Figure 9A:
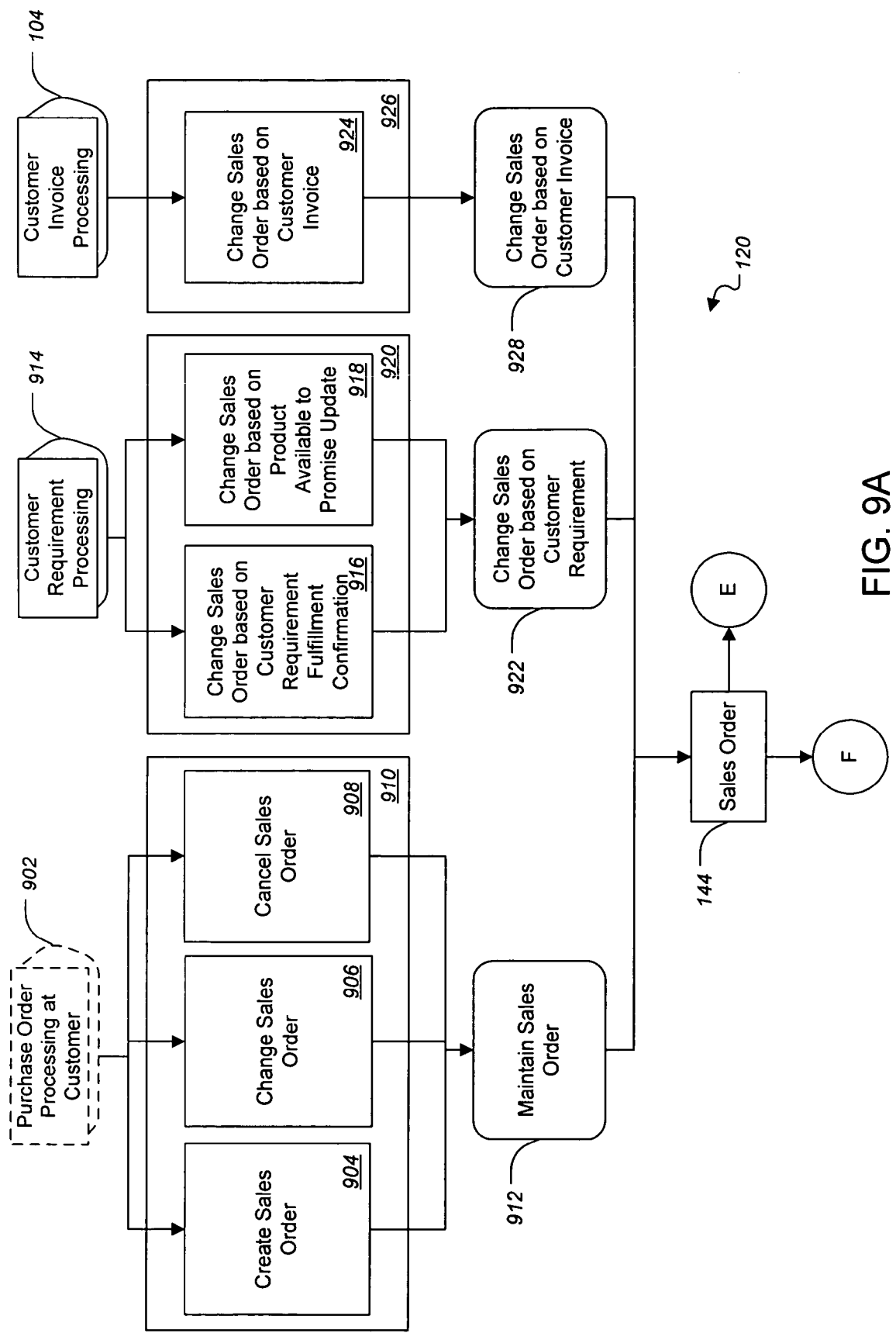
FIGS. 9A, 9B and 9C are block diagrams collectively showing a sales order processing process component.
Figure 9B:
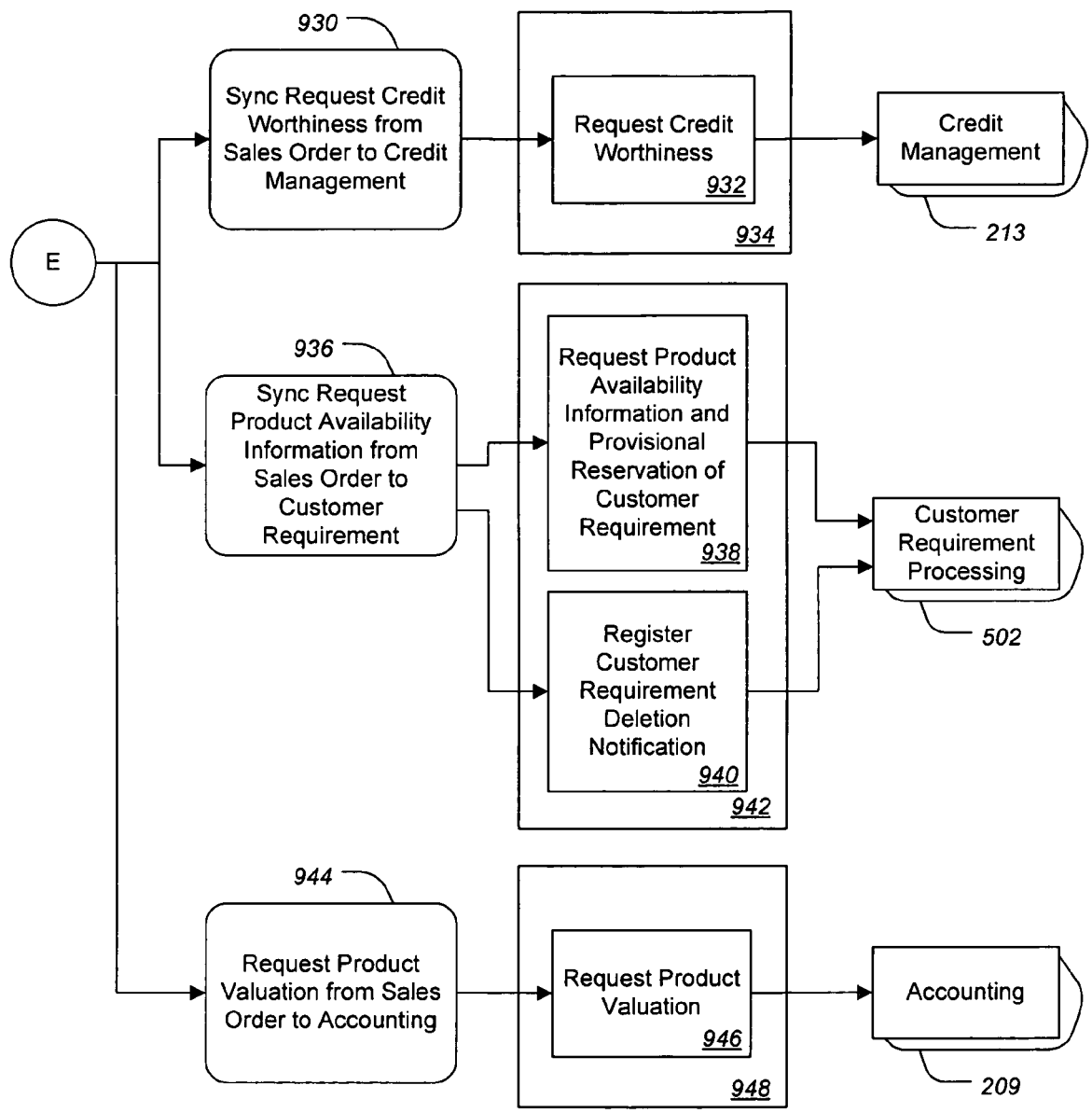
Figure 9C:
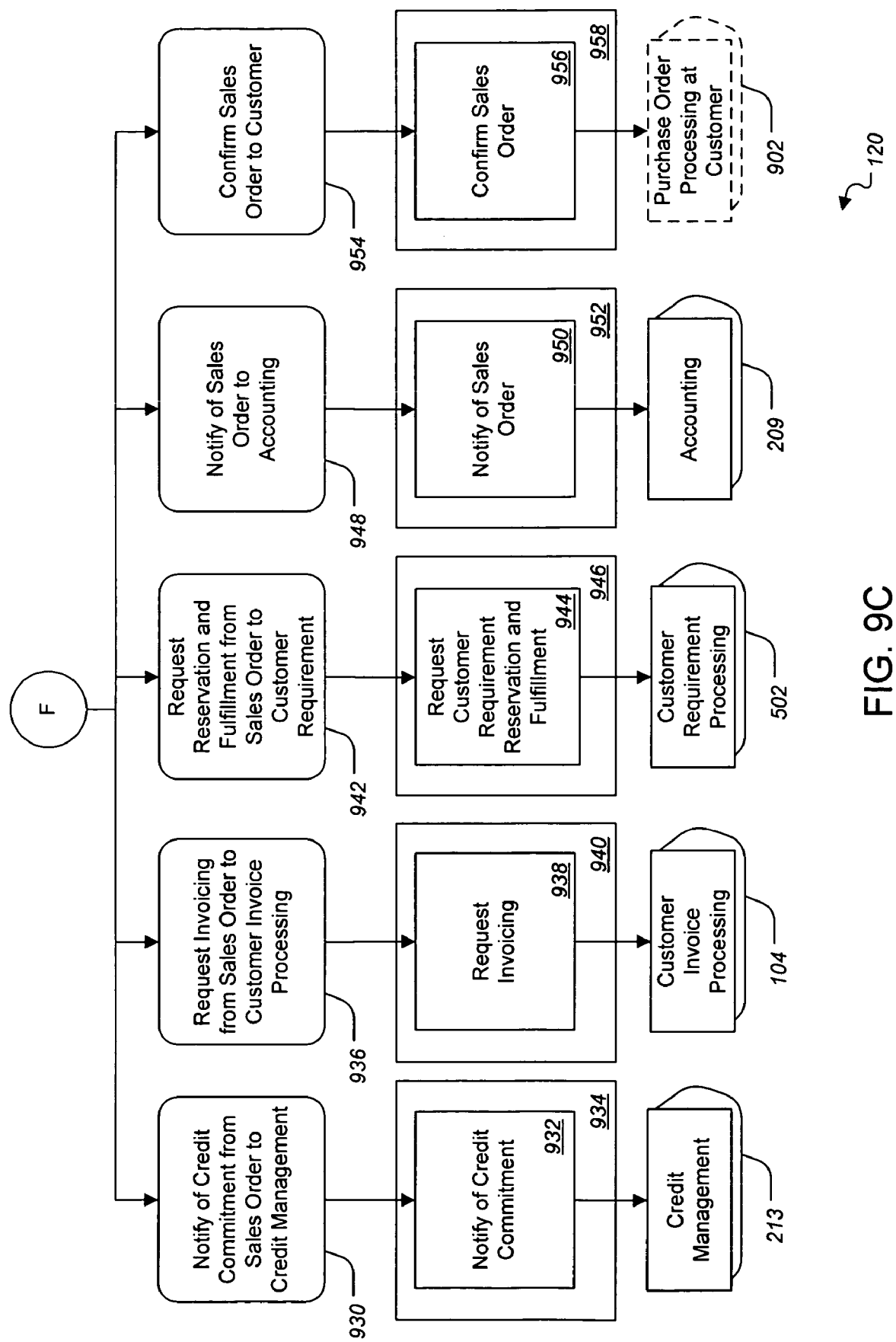

FIGS. 9A, 9B and 9C are block diagrams collectively showing a Sales Order Processing process component 120. The Sales Order Processing process component 120 handles customers' requests to a company for delivery of goods or services. As shown in FIG. 9A, a Purchase Order Processing at Customer external process component 902 may invoke a Create Sales Order operation 904, a Change Sales Order operation 906, or a Cancel Sales Order operation 908. The Create Sales Order operation 904, the Change Sales Order operation 906, and the Cancel Sales Order operation 908 are included in an Ordering In interface 910. The operations 906, 908, and 910 may use a Maintain Sales Order asynchronous outbound process agent 912 may update the Sales Order business object 144.

A Customer Requirement Processing process component 914 may invoke a Change Sales Order based on Customer Requirement Fulfillment Confirmation operation 916 or a Change Sales Order based on Product Available to Promise Update operation 918. The Change Sales Order based on Customer Requirement Fulfillment Confirmation operation 916 and the Change Sales Order based on Product Available to Promise Update operation 918 are included in a Fulfillment In interface 920 and may use a Change Sales Order based on Customer Requirement asynchronous outbound process agent 922 to update the Sales Order business object 144.

The Customer Invoice Processing process component 104 may invoke a Change Sales Order based on Customer Invoice operation 924. The Change Sales Order based on Customer Invoice operation 924 is included in a Request Invoicing In interface 926 and may use a Change Sales Order based on Customer Invoice asynchronous outbound process agent 928 to update the Sales Order business object 144.

As shown in FIG. 9B, the Sales Order business object 144 may use a Synchronous Request Credit Worthiness from Sales Order to Credit Management inbound process agent 930 to invoke a Request Credit Worthiness operation 932. The Request Credit Worthiness operation 932 is included in a Credit Usage Out Interface 934 and may update the Credit Management process component 213.

The Request Credit Worthiness operation 932 may use a Synchronous Request Product Availability Information from Sales Order to Customer Requirement outbound process agent 936 may invoke a Request Product Availability Information and Provision Reservation of Customer Requirement operation 938 or a Register Customer Requirement Deletion Notification operation 940. The Request Product Availability Information and Provision Reservation of Customer Requirement operation 938 and the Register Customer Requirement Deletion Notification operation 940 are included in a Fulfillment Out interface 942 and may update a Customer Requirement Processing process component 502.

The Request Credit Worthiness operation 932 may use a Request Product Valuation from Sales Order to Accounting synchronous outbound process agent 944 to invoke a Request Product Valuation operation 946. The Request Product Valuation operation 946 is included in a Product and Resource Valuation Out interface 948 and may update the Accounting process component 209.

As shown in FIG. 9C, the Sales Order business object 144 may use a Notify of Credit Commitment from Sales Order to Credit Management asynchronous outbound process agent 930 to invoke a Notify of Credit Commitment operation 932. The Notify of Credit Commitment operation 932 is included in a Credit Usage Out interface 934 and may update the Credit Management process component 213.

The Sales Order business object 144 may also use a Request Invoicing from Sales Order to Customer Invoice Processing asynchronous outbound process agent 936 to invoke a Request Invoicing operation 938. The Request Invoicing operation 938 is included in a Request Invoicing Out interface 940 and may update the Customer Invoice Processing process component 104.

The Sales Order business object 144 may also use a Request Reservation and Fulfillment from Sales Order to Customer Requirement asynchronous outbound process agent 942 to invoke a Request Customer Requirement Reservation and Fulfillment operation 944. The Request Customer Requirement Reservation and Fulfillment operation 944 is included in a Fulfillment Out interface 946 and may update the Customer Requirement Processing process component 502.

The Sales Order business object 144 may also use a Notify of Sales Order to Accounting asynchronous outbound process agent 948 to invoke a Notify of Sales Order operation 950. The Notify of Sales Order operation 950 is included in an Order Accounting Out interface 952 and may update the Accounting process component 209.

The Sales Order business object 144 may also use a Confirm Sales Order to Customer asynchronous outbound process agent 954 to invoke a Confirm Sales Order operation 956. The Confirm Sales Order operation 956 is included in an Ordering Out interface 958 and may update the Purchase Order Processing at Customer external process component 902.

Figure 10:
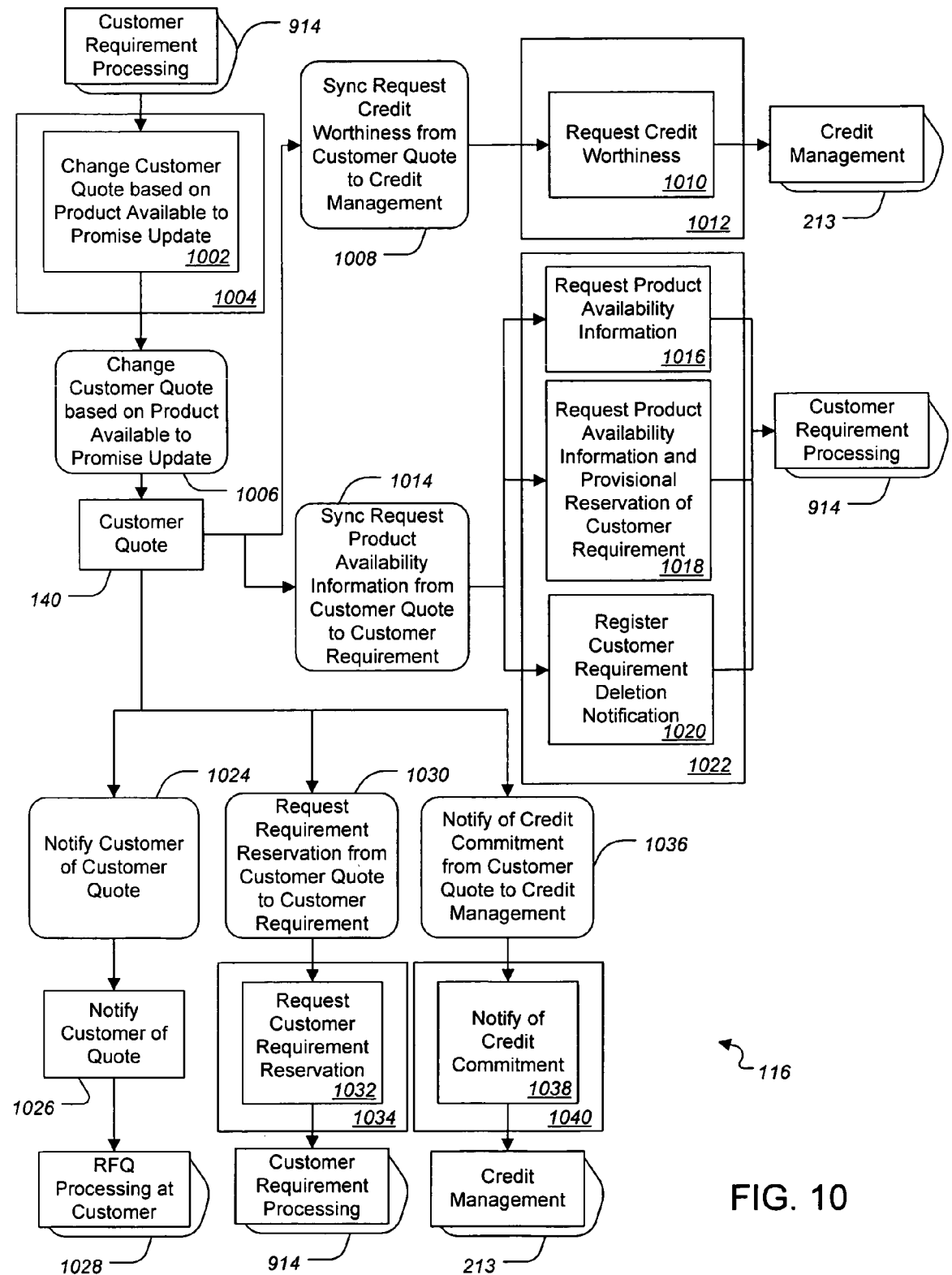
FIG. 10 is a block diagram of a customer quote processing process component.

FIG. 10 is a block diagram showing a Customer Quote Processing process component 116. The Customer Quote Processing process component 116 may be used to offer a customer delivery of goods or services according to a fixed term. The Customer Requirement Processing process component 914 may invoke a Change Customer Quote based on Product Available to Promise Update operation 1002. The Change Customer Quote based on Product Available to Promise Update operation 1002 is included in a Fulfillment In interface 1004 and may use a Change Customer Quote based on Product Available to Promise Update asynchronous outbound process agent 1006 to update the Customer Quote business object 140.

The Customer Quote business object 914 may use a Synchronous Request Credit Worthiness from Customer Quote to Credit Management inbound process agent 1008 to invoke a Request Credit Worthiness operation 1010. The Request Credit Worthiness operation 1010 is included in a Credit Usage Out interface 1012 and may send an update to the Credit Management process component 213.

The Customer Quote business object 914 may also use a Synchronous Request Product Availability Information from Customer Quote to Customer Requirement inbound process agent 1014 to invoke a Request Product Availability Information operation 1016, a Request Product Availability Information and Provisional Reservation of Customer Requirement operation 1018, or a Register Customer Requirement Deletion Notification operation 1020. The operations 1016, 1018, and 1020 are included in a Fulfillment Out interface 1022 and may send an update to the Customer Requirement Processing process component 914.

The Customer Quote business object 914 may also use a Notify Customer of Customer Quote asynchronous inbound process agent 1024 to invoke a Notify of Customer Quote operation 1026 and update a Request for Quote (RFQ) Processing at Customer process component 1028.

The Customer Quote business object 914 may also use a Request Requirement Reservation from Customer Quote to Customer Requirement asynchronous inbound process agent 1030 to invoke a Request Customer Requirement Reservation operation 1032. The Request Customer Requirement Reservation operation 1032 is included in a Fulfillment Out interface 1034 and may update the Customer Requirement Processing process component 914.

The Customer Quote business object 914 may also use a Notify of Credit Commitment from Customer Quote to Credit Management asynchronous inbound process agent 1036 to invoke a Notify of Credit Commitment operation 1038. The Notify of Credit Commitment operation 1038 is included in a Credit Usage Out interface 1040 and may update the Credit Management process component 213.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A system comprising:
    a computer system comprising one or more hardware platforms for executing computer software;
    computer software deployed on the computer system, the computer software implementing a plurality of service operations, the service operations comprising:
    a maintain customer invoice request operation operable to create, update, delete or request cancellation of a customer invoice request;
    a confirm invoicing operation operable to confirm that the customer invoice was created or cancelled to process components which requested invoicing;
    a notify of invoice operation operable to inform accounting about outgoing invoices or credit memos;
    a notify of invoice cancellation operation operable to inform accounting about cancellation of the invoices or credit memos;
    a change service confirmation based on customer invoice operation operable to update the service confirmation in order to document the information about issued customer invoices in the service confirmation;
    a notify of service confirmation operation operable to notify accounting about the creation, change or deletion of the service confirmation;
    a request invoicing operation operable to send a billing due notification to customer invoice processing;
    a change service order based on spare part availability update operation operable to update the service order with spare part availability and to update reservation information based on customer requirement fulfillment planning data;

a change service order based on spare part fulfillment confirmation operation operable to update a service order with spare part quantity delivered to customer, or picked up by a service technician;

a notify of customer return operation operable to notify inbound delivery processing about the creation, change or cancellation of a customer return;

a register spare part requirement deletion notification operation operable to register a provisional spare part requirement reservation for deletion and to trigger deletion in case of failure or cancellation of transaction processing;

a notify of service order operation operable to notify accounting about the creation, change, or deletion of the service order;

a cancel sales order operation operable to notify accounting about the cancellation of a sales order;

a change sales order operation operable to change a sales order based on changes in a purchase order from the customer;

a create sales order operation operable to create a sales order based on a new purchase order from the customer; a change sales order based on customer requirement fulfillment confirmation operation operable to update a sales order with information from fulfillment confirmation;

a change sales order based on product available to promise update operation operable to change a sales order with availability and reservation information based on changes in fulfillment planning;

a confirm customer return operation operable to confirm a customer return to a customer; a request product valuation operation operable to request the value of a product;

a notify of sales order operation operable to notify accounting about the creation, change, or cancellation of the sales order;

a confirm sales order operation operable to confirm the sales order;

a maintain service request operation operable to create or update a service request with a message received from external requester system;

a change service request based on provider's confirmation operation operable to update a service request based on a confirmation message of a service request creation and update progress received from an external provider system;

a request service operation operable to send a service request creation or update to an external provider system;

a notify of service provision operation operable to notify accounting of actual service provided and actual time spent on performing the service;

a notify of service provision cancellation operation operable to notify accounting that a confirmation of a provided service has been cancelled;

a notify of service request operation operable to notify accounting about the creation, change or deletion of the service request;

a confirm service request operation operable to send a creation, update or processing confirmation to an external requester system;

a change customer return based on customer invoice operation operable to send information about invoiced data and values related to items in a current document;

a delivery execution request out operation operable to request a delivery;

a change service request based on customer invoice operation operable to update a service request in order to document the information about issued customer invoices in the service request;

a request customer requirement reservation operation operable to request a reservation for customer requirement;

a request customer requirement reservation and fulfillment operation operable to request reservation and fulfillment for customer requirement;

a request product availability information and provisional reservation of customer requirement operation operable to request product availability information including the creation of a provisional reservation for customer requirement;

a change customer quote based on product available to promise update operation operable to change a customer quote with availability and reservation information based on changes in fulfillment planning;

and a notify of service order credit commitment operation operable to send invoice information necessary to update credit commitment.

2. The system of claim 1, wherein the service operations are grouped into service interfaces, the service interfaces comprising:

a request invoicing in interface that includes the maintain customer invoice request, the change service confirmation based on customer invoice, the request invoice, the change service request based on customer invoice, the change customer return based on customer invoice, and the change sales order based on customer invoice operations;

a request invoicing out interface that includes the confirm invoicing operation and the request invoicing operation;

an invoice accounting out interface that includes the notify of invoice operation and the notify of invoice cancellation operation;

a receivables payables out interface that includes the notify of invoice operation and the request invoice cancellation operation;

an order accounting out interface that includes the notify of service order, the notify of service confirmation, the notify of sales order, the notify of purchase order, the notify of customer return, and the notify of service request operations;

a service provision accounting out interface that includes the notify of service provision operation and the notify of service provision cancellation operation;

a fulfillment in interface that includes the change service order based on spare part availability update, the change service order based on spare part fulfillment confirmation, the change sales order based on customer requirement fulfillment confirmation, the change sales order based on product available to promise update, and the change customer quote based on product available to promise update service operations;

a fulfillment out interface that includes the register spare part requirement deletion notification, the request spare part requirement reservation and fulfillment, the request product availability information and provisional reservation of customer requirement, and the request customer requirement reservation and fulfillment operations;

an external providing in interface that includes the maintain service request operation;

an external providing out interface that includes the confirm service request operation;

an external requesting in interface that includes the change service request based on provider's confirmation operation;

an external requesting out interface that includes the request service operation;

a delivery execution request out interface that includes the delivery execution request out operation;

an ordering in interface that includes the create sales order, the change sales order and the cancel sales order operations;

an ordering out interface that includes the confirm sales order operation; and a product and resource valuation out interface that includes the request product valuation operation.

3. The system of claim 1, wherein:

the computer software implementing the maintain customer invoice request operation, the notify of invoice operation, and the confirm invoicing operation is deployed on a first hardware platform; and the computer software implementing the request credit limit check operation, the notify customer of invoice operation, the notify of credit commitment operation, the notify of invoice cancellation operation, the notify of cash payment operation, the request cash payment cancellation operation, the notify of inventory change operation, the request inventory change and activity provision cancellation operation, the change service confirmation based on customer invoice operation, the notify of service confirmation operation, the request invoicing operation, the change service order based on spare part availability update operation, the change service order based on spare part fulfillment confirmation operation, the notify of customer return operation, the register spare part requirement deletion notification operation, the change service order based on customer invoice operation, the request spare part requirement reservation and fulfillment operation, the notify of service order operation, the cancel sales order operation, the change sales order operation, the create sales order operation, the change sales order based on customer requirement fulfillment confirmation operation, the change sales order based on product available to promise update operation, the confirm customer return operation, the request product valuation operation, the notify of credit commitment operation, the notify of sales order operation, the confirm sales order operation, the maintain service request operation, the change service request based on provider's confirmation operation, the request service operation, the notify of service provision operation, the notify of service provision cancellation operation, the notify of service request operation, the confirm service request operation, the change customer return based on customer invoice operation, the change service request based on customer invoice operation, the request customer requirement reservation operation, the request customer requirement reservation and fulfillment operation, the request product availability information and provisional reservation of customer requirement operation, the request credit worthiness operation, the change customer quote based on product available to promise update operation, the notify of inventory change operation, the notify of service order credit commitment operation, the confirm customer return operation, the financial expense notification operation, the request inbound return delivery operation, and is deployed on a second hardware platform.

4. The system of claim 3, wherein each of the first and the second hardware platforms are distinct and separate from each other.

5. The system of claim 1, wherein:

the computer software implementing the maintain customer invoice request operation, the notify of invoice operation, and the confirm invoicing operation is deployable on a first hardware platform; and the computer software implementing the request credit limit check operation, the notify customer of invoice operation, the notify of credit commitment operation, the notify of invoice cancellation operation, the notify of cash payment operation, the request cash payment cancellation operation, the notify of inventory change operation, the request inventory change and activity provision cancellation operation, the change service confirmation based on customer invoice operation, the notify of service confirmation operation, the request invoicing operation, the change service order based on spare part availability update operation, the change service order based on spare part fulfillment confirmation operation, the notify of customer return operation, the register spare part requirement deletion notification operation, the change service order based on customer invoice operation, the request spare part requirement reservation and fulfillment operation, the notify of service order operation, the cancel sales order operation, the change sales order operation, the create sales order operation, the change sales order based on customer requirement fulfillment confirmation operation, the change sales order based on product available to promise update operation, the confirm customer return operation, the request product valuation operation, the notify of credit commitment operation, the notify of sales order operation, the confirm sales order operation, the maintain service request operation, the change service request based on provider's confirmation operation, the request service operation, the notify of service provision operation, the notify of service provision cancellation operation, the notify of service request operation, the confirm service request operation, the change customer return based on customer invoice operation, the change service request based on customer invoice operation, the request customer requirement reservation operation, the request customer requirement reservation and fulfillment operation, the request product availability information and provisional reservation of customer requirement operation, the request credit worthiness operation, the change customer quote based on product available to promise update operation, the notify of inventory change operation, the notify of service order credit commitment operation, the confirm customer return operation, the financial expense notification operation, and the request inbound return delivery operation is deployable on a second hardware platform;

the first and the second hardware platforms being distinct and separate from each other.

6. The system of claim 1, wherein the computer software deployed on the computer system comprises:

a plurality of process components, each of the process components being a package of software deployed and executing on the computer system and implementing a respective and distinct business process, the plurality of process components including:

a customer invoice processing process component used to charge a customer for the delivery of goods or services;

an opportunity processing process component used to process customer relationship opportunities;

a service confirmation processing process component used to handle services rendered for a service order;

a service order processing process component used to handle short-term agreements between a customer and a service provider;

a service request processing process component used to cover requests from a customer to a service provider to answer a question or solve a problem about a product;

a customer return processing process component used to initiate the return of a product from the customer back to a provider or seller;

a sales order processing process component used to handle customers' requests to a company for delivery of goods or services; and a customer quote processing process component used to offer to a customer for the delivery of goods or services according to fixed terms;

and wherein:

the customer invoice processing process component implements the maintain customer invoice request, the notify of inventory change, the request inventory change and activity provision cancellation, the notify of invoice, the notify of invoice cancellation, the notify of credit commitment, and the confirm invoicing service operation;

the service confirmation processing process component implements the notify of inventory change, the notify of service provision, the notify of service provision cancellation, the change service confirmation based on customer invoice, the notify of service confirmation, and the request invoicing service operations;

the service order processing process component implements the notify of service order credit commitment, the request credit limit check, the change service order based on product availability update, the change service order based on product customer requirement fulfillment confirmation, the register product customer requirement deletion notification, the request product availability information and provisional reservation, the request product customer requirement reservation and fulfillment, the notify of service order, the request invoicing, and the change service order based on customer invoice service operations;

the service request processing process component implements the change service request based on customer invoice, the request service, the notify of service provision, the notify of service provision cancellation, the notify of service request, the maintain service request, the request invoicing, and the confirm service request service operations;

the customer return processing process component implements the confirm customer return, the notify of customer return, the change customer return based on customer invoice, the request invoicing, and the notify of customer return service operations;

the sales order processing process component implements the notify of sales order, the register product customer requirement deletion notification, the request product availability information and provisional reservation, the request product customer requirement reservation and fulfillment, the change sales order based on product availability update, the change sales order based on product customer requirement fulfillment confirmation, the confirm sales order, the request product valuation, the cancel sales order, the change sales order, the create sales order, the change sales order based on customer invoice, and the request invoicing service operations; and the customer quote processing process component implements the register product customer requirement deletion notification, the request product availability information and provisional reservation of customer requirement, the request product availability information, the request product customer requirement reservation, the request product valuation, and the change customer quote based on product available to promise update service operations.

7. The system of claim 1, wherein the computer software deployed on the computer system comprises:

a plurality of deployment units, each of the deployment units being a package of software packaged together to be deployed on a single physical hardware platform, the plurality of deployment units including:

a customer invoicing deployment unit; and a customer relationship management deployment unit;

and wherein:

the customer invoicing deployment unit implements the maintain customer invoice request operation, the notify of invoice operation, and the confirm invoicing operation; and the customer relationship management deployment unit implements the request credit limit check operation, the notify customer of invoice operation, the notify of credit commitment operation, the notify of invoice cancellation operation, the notify of cash payment operation, the request cash payment cancellation operation, the notify of inventory change operation, the request inventory change and activity provision cancellation operation, the change service confirmation based on customer invoice operation, the notify of service confirmation operation, the request invoicing operation, the change service order based on spare part availability update operation, the change service order based on spare part fulfillment confirmation operation, the notify of customer return operation, the register spare part requirement deletion notification operation, the change service order based on customer invoice operation, the request spare part requirement reservation and fulfillment operation, the notify of service order operation, the cancel sales order operation, the change sales order operation, the create sales order operation, the change sales order based on customer requirement fulfillment confirmation operation, the change sales order based on product available to promise update operation, the confirm customer return operation, the request product valuation operation, the notify of credit commitment operation, the notify of sales order operation, the confirm sales order operation, the maintain service request operation, the change service request based on provider's confirmation operation, the request service operation, the notify of service provision operation, the notify of service provision cancellation operation, the notify of service request operation, the confirm service request operation, the change customer return based on customer invoice operation, the change service request based on customer invoice operation, the request customer requirement reservation operation, the request customer requirement reservation and fulfillment operation, the request product availability information and provisional reservation of customer requirement operation, the request credit worthiness operation, the change customer quote based on product available to promise update operation, the notify of inventory change operation, the notify of service order credit commitment operation, the confirm customer return operation, the financial expense notification operation, and the request inbound return delivery operation.

8. The system of claim 1, further comprising:
a repository of service descriptions, the repository including a standards-based description of each of the plurality of service operations.

9. A computer program product encoded on a tangible machine-readable information carrier for implementing a plurality of services, the product comprising computer software operable to implement service operations on a computer system, the service operations comprising:

a maintain customer invoice request operation operable to create, update, delete or request cancellation of a customer invoice request;

a confirm invoicing operation operable to confirm that the customer invoice was created or cancelled to process components which requested invoicing;

a notify of invoice operation operable to inform accounting about outgoing invoices or credit memos;

a notify of invoice cancellation operation operable to inform accounting about cancellation of the invoices or credit memos;

a change service confirmation based on customer invoice operation operable to update the service confirmation in order to document the information about issued customer invoices in the service confirmation;

a notify of service confirmation operation operable to notify accounting about the creation, change or deletion of the service confirmation;

a request invoicing operation operable to send a billing due notification to customer invoice processing;

a change service order based on spare part availability update operation operable to update the service order with spare part availability and to update reservation information based on customer requirement fulfillment planning data;

a change service order based on spare part fulfillment confirmation operation operable to update a service order with spare part quantity delivered to customer, or picked up by a service technician;

a notify of customer return operation operable to notify inbound delivery processing about the creation, change or cancellation of a customer return;

a register spare part requirement deletion notification operation operable to register a provisional spare part requirement reservation for deletion and to trigger deletion in case of failure or cancellation of transaction processing;

a notify of service order operation operable to notify accounting about the creation, change, or deletion of the service order;

a cancel sales order operation operable to notify accounting about the cancellation of a sales order;

a change sales order operation operable to change a sales order based on changes in a purchase order from the customer;

a create sales order operation operable to create a sales order based on a new purchase order from the customer;

a change sales order based on customer requirement fulfillment confirmation operation operable to update a sales order with information from fulfillment confirmation;

a change sales order based on product available to promise update operation operable to change a sales order with availability and reservation information based on changes in fulfillment planning;

a confirm customer return operation operable to confirm a customer return to a customer;

a request product valuation operation operable to request the value of a product;

a notify of sales order operation operable to notify accounting about the creation, change, or cancellation of the sales order;

a confirm sales order operation operable to confirm the sales order;

a maintain service request operation operable to create or update a service request with a message received from external requester system;

a change service request based on provider's confirmation operation operable to update a service request based on a confirmation message of a service request creation and update progress received from an external provider system;

a request service operation operable to send a service request creation or update to an external provider system;

a notify of service provision operation operable to notify accounting of actual service provided and actual time spent on performing the service;

a notify of service provision cancellation operation operable to notify accounting that a confirmation of a provided service has been cancelled;

a notify of service request operation operable to notify accounting about the creation, change or deletion of the service request;

a confirm service request operation operable to send a creation, update or processing confirmation to an external requester system;

a change customer return based on customer invoice operation operable to send information about invoiced data and values related to items in a current document;

a delivery execution request out operation operable to request a delivery;

a change service request based on customer invoice operation operable to update a service request in order to document the information about issued customer invoices in the service request;

a request customer requirement reservation operation operable to request a reservation for customer requirement;

a request customer requirement reservation and fulfillment operation operable to request reservation and fulfillment for customer requirement;

a request product availability information and provisional reservation of customer requirement operation operable to request product availability information including the creation of a provisional reservation for customer requirement;

a change customer quote based on product available to promise update operation operable to change a customer quote with availability and reservation information based on changes in fulfillment planning;

and a notify of service order credit commitment operation operable to send invoice information necessary to update credit commitment.

10. The product of claim 9, wherein the computer software comprises:
a plurality of process components, each of the process components being a package of software deployed and executing on the computer system and implementing a respective and distinct business process, the plurality of process components including:
a customer invoice processing process component used to charge a customer for the delivery of goods or services;
an opportunity processing process component used to process customer relationship opportunities;
a service confirmation processing process component used to handle services rendered for a service order;
a service order processing process component used to handle short-term agreements between a customer and a service provider;
a service request processing process component used to cover requests from a customer to a service provider to answer a question or solve a problem about a product;
a customer return processing process component used to initiate the return of a product from the customer back to a provider or seller;
a sales order processing process component used to handle customers' requests to a company for delivery of goods or services; and
a customer quote processing process component used to offer to a customer for the delivery of goods or services according to fixed terms;
and wherein:
the customer invoice processing process component implements the maintain customer invoice request, the notify of inventory change, the request inventory change and activity provision cancellation, the notify of invoice, the notify of invoice cancellation, the notify of credit commitment, and the confirm invoicing service operation;
the service confirmation processing process component implements the notify of inventory change, the notify of service provision, the notify of service provision cancellation, the change service confirmation based on customer invoice, the notify of service confirmation, and the request invoicing service operations;
the service order processing process component implements the notify of service order credit commitment, the request credit limit check, the change service order based on product availability update, the change service order based on product customer requirement fulfillment confirmation, the register product customer requirement deletion notification, the request product availability information and provisional reservation, the request product customer requirement reservation and fulfillment, the notify of service order, the request invoicing, and the change service order based on customer invoice service operations;
the service request processing process component implements the change service request based on customer invoice, the request service, the notify of service provision, the notify of service provision cancellation, the notify of service request, the maintain service request, the request invoicing, and the confirm service request service operations;
the customer return processing process component implements the confirm customer return, the notify of customer return, the change customer return based on customer invoice, the request invoicing, and the notify of customer return service operations;
the sales order processing process component implements the notify of sales order, the register product customer requirement deletion notification, the request product availability information and provisional reservation, the request product customer requirement reservation and fulfillment, the change sales order based on product availability update, the change sales order based on product customer requirement fulfillment confirmation, the confirm sales order, the request product valuation, the cancel sales order, the change sales order, the create sales order, the change sales order based on customer invoice, and the request invoicing service operations; and
the customer quote processing process component implements the register product customer requirement deletion notification, the request product availability information and provisional reservation of customer requirement, the request product availability information, the request product customer requirement reservation, the request product valuation, and the change customer quote based on product available to promise update service operations.

11. The product of claim 9, wherein the computer software comprises:
a plurality of deployment units, each of the deployment units being a package of software packaged together to be deployed on a single physical hardware platform, the plurality of deployment units including:
a customer invoice deployment unit that includes a customer invoice request and a customer invoice business object, wherein the customer invoice request business object maintains a customer invoice request and the customer invoice business object charges a customer for delivery of goods or services; and
a customer relationship management deployment unit that includes a customer problem and solution, a direct mail template, an opportunity, a service confirmation, a service order, a service request, a customer return, a sales order, a customer quote, and a direct mail run business object, wherein the customer problem and solution business object is a collection of information consisting of a problem that is reported by a customer, the direct mail template business object is a template which is used to automatically generate personalized mail in order to contact customers and prospects, the opportunity business object represents a recognized possibility for sales of products or services, the service confirmation business object stores the actual resource consumption of performed service operations including working time and the parts and expenses related to service fulfillment, the service order business object represents customer orders to service providers for the delivery of services, the service request business object reflects the initial inquiry of a customer when contacting a customer service and support center, the customer return business object initiates the return of a product from a customer back to a provider or seller, the direct mail run business object is a specification of a serial letter sent as personalized mail to selected customers and prospects by means of multiple communication channels, the sales order business object is a customer request to the company for delivery of goods or services at a certain time, and the customer quote business object is an offer by a vendor to a customer for the delivery of goods or services according to fixed terms.

12. The product of claim 10, wherein:

each of the plurality of process components is assigned to no more than one deployment unit among multiple deployment units, and each deployment unit is deployable on a separate computer hardware platform independent of every other deployment unit; and all interaction between a process component in one deployment unit and any other process component in any other deployment unit takes place through the respective service operations of the two process components.

13. The product of claim 12, wherein the deployment units comprise:

a customer invoice deployment unit that includes the customer invoice processing process component; and a customer relationship management deployment unit that includes the customer quote processing, the sales order processing, the customer return processing, the service request processing, the opportunity processing, the service order processing, the direct mail processing, and the service confirmation processing process components.

14. The product of claim 9, further comprising:

a customer invoicing deployment unit that implements the maintain customer invoice request operation, the notify of invoice operation, and the confirm invoicing operation; and a customer relationship management deployment unit that implements the request credit limit check operation, the notify customer of invoice operation, the notify of credit commitment operation, the notify of invoice cancellation operation, the notify of cash payment operation, the request cash payment cancellation operation, the notify of inventory change operation, the request inventory change and activity provision cancellation operation, the change service confirmation based on customer invoice operation, the notify of service confirmation operation, the request invoicing operation, the change service order based on spare part availability update operation, the change service order based on spare part fulfillment confirmation operation, the notify of customer return operation, the register spare part requirement deletion notification operation, the change service order based on customer invoice operation, the request spare part requirement reservation and fulfillment operation, the notify of service order operation, the cancel sales order operation, the change sales order operation, the create sales order operation, the change sales order based on customer requirement fulfillment confirmation operation, the change sales order based on product available to promise update operation, the confirm customer return operation, the request product valuation operation, the notify of credit commitment operation, the notify of sales order operation, the confirm sales order operation, the maintain service request operation, the change service request based on provider's confirmation operation, the request service operation, the notify of service provision operation, the notify of service provision cancellation operation, the notify of service request operation, the confirm service request operation, the change customer return based on customer invoice operation, the change service request based on customer invoice operation, the request customer requirement reservation operation, the request customer requirement reservation and fulfillment operation, the request product availability information and provisional reservation of customer requirement operation, the request credit worthiness operation, the change customer quote based on product available to promise update operation, the notify of inventory change operation, the notify of service order credit commitment operation, the confirm customer return operation, the financial expense notification operation, and the request inbound return delivery operation.

15. The product of claim 10, wherein:

the customer invoice processing process component includes a customer invoice request and a customer invoice business object wherein the customer invoice request business object maintains a customer invoice request and the customer invoice business object charges a customer for delivery of goods or services;

the customer quote processing process component includes a customer quote business object wherein the customer quote business object represents an offer by a vendor to a customer for the delivery of goods or services according to fixed terms;

the sales order processing process component includes a sales order business object wherein the sales order business object represents a customer request to the company for delivery of goods or services at a certain time;

the customer return processing process component includes a customer return business object wherein the customer return business object initiates the return of a product from a customer back to a provider or seller;

the service request processing process component includes a support request and a service request business object, wherein the support request is used to resolve an incident in the operations of an IT solution, and the service request business object reflects the initial inquiry of a customer when contacting a customer service and support center;

the opportunity processing process component includes an opportunity business object wherein the opportunity business object represents a recognized possibility for sales of products or services;

the direct mail processing process component includes a direct mail template business object and a direct mail run business object, wherein the direct mail template business object is a template which is used to automatically generate personalized mail and the direct mail run business object is a specification of a serial letter sent as personalized mail to selected customers;

the service order processing process component includes a service order business object wherein the service order business object represents customer orders to service providers for the delivery of services; and the service confirmation processing process component includes a service confirmation business object wherein the service confirmation business object stores the actual resource consumption of performed service operations including working time and the parts and expenses related to service fulfillment.

16. The product of claim 10, wherein:

each of the process components includes one or more business objects; and none of the business objects of any one of the process components interacts directly with any of the business objects included in any of the other process components.

17. The product of claim 16, wherein the business objects comprise a business process object.

18. The product of claim 16, wherein:
none of the business objects included in any one of the process components is included in any of the other process components.

19. The product of claim 9, further comprising:
a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component; wherein:
   the inbound process agents comprise a first inbound process agent operable to start the execution of step requested in a first inbound message by creating or updating one or more business object instances; and
   the outbound process agents comprise a first asynchronous outbound process agent that is called after a business object that is associated with the first outbound process agent changes.

\* \* \* \* \*